(12) United States Patent
Lubnin et al.

(10) Patent No.: US 6,897,281 B2
(45) Date of Patent: May 24, 2005

(54) BREATHABLE POLYURETHANES, BLENDS, AND ARTICLES

(75) Inventors: Alexander V. Lubnin, Copley, OH (US); George E. Snow, Medina, OH (US); Ronald D. Varn, North Canton, OH (US); Gary A. Anderle, North Olmsted, OH (US)

(73) Assignee: Noveon IP Holdings Corp., Cleveland, OH (US)

(*) Notice: Subject to any disclaimer, the term of this patent is extended or adjusted under 35 U.S.C. 154(b) by 255 days.

(21) Appl. No.: 10/174,899

(22) Filed: Jun. 19, 2002

(65) Prior Publication Data

US 2003/0195293 A1 Oct. 16, 2003

Related U.S. Application Data

(60) Provisional application No. 60/370,135, filed on Apr. 5, 2002.

(51) Int. Cl.$^7$ .............................. C08J 3/00; C08K 3/20; C08L 75/00; C08G 18/00; C08G 18/32

(52) U.S. Cl. .................. 528/44; 424/78.02; 428/423.1; 442/119; 524/507; 524/589; 524/590; 524/591; 524/839; 524/840; 525/123; 525/455; 528/65; 528/66; 528/68; 528/71; 528/85

(58) Field of Search .............................. 528/44, 65, 66, 528/68, 71, 85; 524/507, 589, 590, 591, 839, 840; 428/423.1; 525/123, 455; 424/78.02; 442/119

(56) References Cited

U.S. PATENT DOCUMENTS

| | | | |
|---|---|---|---|
| 2,438,091 A | 3/1948 | Lynch | |
| 2,528,378 A | 10/1950 | Mannheimer | |
| 2,658,072 A | 11/1953 | Kosmin | |
| 3,755,560 A | 8/1973 | Dickert | |
| 3,905,929 A | 9/1975 | Noll | |
| 3,920,598 A | 11/1975 | Reiff | |
| 4,092,286 A | 5/1978 | Noll | |
| 4,190,566 A | 2/1980 | Noll | |
| 4,292,420 A | 9/1981 | Turner | |
| 4,421,769 A | 12/1983 | Dixon | |
| 4,704,272 A | 11/1987 | Oh | |
| 4,741,855 A | 5/1988 | Grote | |
| 4,788,006 A | 11/1988 | Bolich | |
| 4,920,176 A | 4/1990 | Jorgensen, Jr. | |
| 4,925,732 A | 5/1990 | Driskill et al. | ............... 428/336 |
| 4,983,662 A | 1/1991 | Overbeek | |
| 4,992,507 A | 2/1991 | Coogan | |
| 5,011,681 A | 4/1991 | Ciotti | |
| 5,043,381 A | 8/1991 | Coogan | |
| 5,073,372 A | 12/1991 | Turner | |
| 5,177,141 A | 1/1993 | Thoma et al. | ............... 524/591 |
| 5,380,528 A | 1/1995 | Alban | |
| 5,599,549 A | 2/1997 | Wivell | |
| 5,700,867 A | 12/1997 | Ishiyama | |
| 5,874,095 A | 2/1999 | Deckner | |
| 5,883,085 A | 3/1999 | Blank | |
| 5,948,416 A | 9/1999 | Wagner | |
| 6,013,271 A | 1/2000 | Doughty | |
| 6,017,997 A | 1/2000 | Snow | |
| 6,020,438 A | 2/2000 | Lubnin | |

FOREIGN PATENT DOCUMENTS

| | | |
|---|---|---|
| EP | 0595149 | 5/1994 |
| WO | WO 02/02657 A3 | 1/2002 |
| WO | WO 02/02657 A2 | 1/2002 |
| WO | WO 02/08327 A1 | 1/2002 |

OTHER PUBLICATIONS

Dederichs, et al, "Tailor made polyetherdiols".

Dept. of Health and Human Services, "Sunscreen Drug Products for Over–the–Counter Human Use; Final Monograph", Federal Register, May 21, 1999, pp. 27666–27693, vol. 64, No. 98.

Tate, et al, Encyclopedia of Polymer Science and Engineering, vol. 2, p. 537.

Todd, "Volatile silicone fluids for cosmetic formulations", Cosmetics and Toiletries, Jan. 1976, pp. 29–32, vol. 91.

*Primary Examiner*—Patrick D. Niland
(74) *Attorney, Agent, or Firm*—Thoburn T. Dunlap; Charles A. Crehore

(57) ABSTRACT

A breathable polyurethane having an upright moisture vapor transmission rate (MVTR) of more than about 500 gms/m$^2$/24 hr comprises:

(a) poly(alkylene oxide) side-chain units in an amount comprising about 12 wt. % to about 80 wt. % of said polyurethane, wherein (i) alkylene oxide groups in said poly(alkylene oxide) side-chain units have from 2 to 10 carbon atoms and are unsubstituted, substituted, or both unsubstituted and substituted, (ii) at least about 50 wt. % of said alkylene oxide groups are ethylene oxide, and (iii) said amount of said side-chain units is (i) at least about 30 wt. % when the molecular weight of said side-chain units is less than about 600 grams/mole, (ii) at least about 15 wt. % when the molecular weight of said side-chain units is from about 600 to about 1,000 grams/mole, and at least about 12 wt. % when the molecular weight of said side-chain units is more than about 1,000 grams/mole, and (b) poly(ethylene oxide) main-chain units in an amount comprising less than about 25 wt. % of said polyurethane.

Coatings and films for textiles and other articles and applications using such polyurethanes have excellent breathability, i.e., high moisture vapor transmission rates (MVTR).

124 Claims, No Drawings

BREATHABLE POLYURETHANES, BLENDS, AND ARTICLES

RELATED APPLICATION

This application claims the priority filing date of U.S. Provisional Application Ser. No. 60/370135 filed Apr. 5, 2002.

FIELD OF THE INVENTION

This invention relates to waterborne polyurethane dispersions used to make polyurethanes having excellent breathability, i.e., high moisture vapor transmission rates (MVTR). Such polyurethanes comprise (a) poly(alkylene oxide) side-chain units in an amount comprising about 12 wt. % to about 80 wt. % of the polyurethane, wherein (i) alkylene oxide groups in said poly(alkylene oxide) side-chain units have from 2 to 10 carbon atoms and are unsubstituted, substituted, or both unsubstituted and substituted, (ii) at least about 50 wt. % of said alkylene oxide groups are ethylene oxide, and (iii) the amount of side-chain units is at least about 30 wt. % when the molecular weight of side-chain units is less than about 600 grams/mole, at least about 15 wt. % when the molecular weight of side-chain units is from about 600 to about 1,000 grams/mole, and at least about 12 wt. % when the molecular weight of side-chain units is more than about 1,000 grams/mole, and (b) poly(ethylene oxide) main-chain units in an amount comprising less than about 25 wt. % of the polyurethane.

BACKGROUND OF THE INVENTION

U.S. Pat. No. 5,700,867 relates to an aqueous polyurethane dispersion having an ionic functional group, polyoxyethylene units and hydrazine groups and used as a composition for ink, coating or adhesive. The polyoxyethylene units can be in the main chain, at the end of the main chain or in side chains of the aqueous polyurethane. The content of polyoxyethylene units is about 20% by weight or less of the weight of the resin. Desirable properties of the composition include storage stability, water resistance, pigment dispersibility, and adhesion. There is no teaching or suggestion regarding breathability properties of the composition or the importance of amounts and length of side-chain and main-chain polyoxyethylene in achieving both breathability and other suitable polyurethane properties.

U.S. Pat. No. 5,043,381 relates to an aqueous dispersion of a nonionic water-dispersible polyurethane having pendant polyoxyethylene chains and one crosslink per 3,000 to 100,000 atomic weight units. U.S. Pat. No. 4,992,507 relates to an aqueous dispersion of a nonionic, water-dispersible polyurethane having pendant polyoxyethylene chains and free acid or free tertiary amino groups. Diols and diisocyanates having pendant polyoxyethylene chains are mentioned generally in both of the latter two patents, such as those in U.S. Pat. Nos. 3,905,929 and 3,920,598 respectively. The dispersions are useful as coating compositions, but there is no teaching or suggestion in any of the latter four references regarding breathability properties of the compositions or the importance of amounts and length of side-chain and main-chain polyoxyethylene in achieving both breathability and other suitable polyurethane properties.

U.S. Pat. No. 4,983,662 relates to an aqueous self-crosslinkable coating composition comprising an aqueous dispersion of at least one polyurethane and having hydrazine (or hydrazone) functional groups and carbonyl functional groups disposed therein to provide a selfcrosslinkable reaction, in which the polyurethane polymer takes part, via azomethine formation during and/or after film formation. There is no teaching or suggestion regarding breathability properties of the composition or the importance of amounts and length of side-chain and main-chain polyoxyethylene in achieving both breathability and other suitable polyurethane properties. In addition, Applicants' breathable polyurethanes do not contain hydrazine functional groups or hydrazone functional groups.

U.S. Pat. No. 4,190,566 relates to non-ionic, water-dispersible polyurethanes having a substantially linear molecular structure and lateral polyalkylene oxide chains having about 3 to 30% by weight of lateral polyalkylene oxide polyether chains. The chains consist of about 40–95% ethylene oxide units and 5–60% certain other alkylene oxide units selected from the group consisting of propylene oxide, butylene oxide and styrene oxide). Coatings are among the many uses listed, but there is no teaching regarding breathability properties of the composition or the importance of amounts and length of side-chain and main-chain polyoxyethylene in achieving both breathability and other suitable polyurethane properties.

U.S. Pat. No. 4,092,286 relates to water-dispersible polyurethane elastomers having a substantially linear molecular structure, characterized by (a) lateral polyalkylene oxide units of from about 0.5 to 10% by weight, based on the polyurethane as a whole and (b) a content of $=N^+=$, $—COO^-$ or $—SO_3^-$ groups of from about 0.1 to 15 milliequivalents per 100 g. Coatings are among the many uses listed, but there is no teaching or suggestion regarding breathability properties of the composition or the importance of amounts and length of side-chain and main-chain polyoxyethylene in achieving both breathability and other suitable polyurethane properties.

A waterborne polyurethane dispersion is desired that can be used to produce films, coatings and other compositions having improved moisture vapor transmission rates and other improved properties compared to polyurethanes of the prior art.

SUMMARY OF THE INVENTION

Breathable polyurethanes comprise (a) poly(alkylene oxide) side-chain units in an amount comprising about 12 wt. % to about 80 wt. % of the polyurethane, wherein (i) alkylene oxide groups in said poly(alkylene oxide) side-chain units have from 2 to 10 carbon atoms and are unsubstituted, substituted, or both unsubstituted and substituted, (ii) at least about 50 wt. % of said alkylene oxide groups are ethylene oxide, and (iii) the amount of side-chain units is (i) at least about 30 wt. % when the molecular weight of side-chain units is less than about 600 grams/mole, (ii) at least about 15 wt. % when the molecular weight of side-chain units is from about 600 to about 1,000 grams/mole, and (iii) at least about 12 wt. % when the molecular weight of side-chain units is more than about 1,000 grams/mole, and (b) poly(ethylene oxide) main-chain units in an amount comprising less than about 25 wt. % of the polyurethane.

A preferred process for making such breathable polyurethanes comprises:
(A) reacting to form an isocyanate-terminated prepolymer
(1) at least one polyisocyanate having an average of about two or more isocyanate groups; (2) at least one active hydrogen-containing compound comprising (a) poly(alkylene oxide) side-chain units in an amount comprising about 12 wt. % to about 80 wt. % of said polyurethane, wherein (i) alkylene oxide groups in said poly(alkylene oxide) side-chain units have from 2 to 10 carbon atoms and are unsubstituted, substituted, or both unsubstituted and substituted, (ii) at least about 50 wt. % of said alkylene oxide groups are ethylene oxide, and (iii) said amount of said side-chain units is at least about 30 wt. % when the molecular weight of said side-chain units is less than about 600 grams/mole, at least about 15 wt. % when the molecular weight of said side-chain units is from about 600 to about 1,000 grams/mole, and at least about 12 wt. % when the molecular weight of said side-chain units is more than about 1,000 grams/mole, and (b) poly(alkylene oxide) main-chain units in an amount comprising less than about 25 wt. % of said polyurethane; (3) preferably at least one other active hydrogen-containing compound not containing poly(alkylene oxide) side-chain units; and (4) optionally at least one compound having at least one crosslinkable functional group, in order to form an isocyanate-terminated prepolymer;

(B) dispersing said prepolymer in water, and chain extending said prepolymer by reaction with at least one of water, inorganic or organic polyamine having an average of about 2 or more primary and/or secondary amine groups, polyalcohols, ureas, or combinations thereof; and (C) thereafter further processing the chain-extended dispersion of step (B) in order to form a composition or article having an upright moisture vapor transmission rate (MVTR) of more than about 500 gms/m$^2$/24 hours.

Coatings and other articles made using such dispersions have excellent breathability, i.e., high moisture vapor transmission rates (MVTR) and can be made without volatile organic compounds such as solvents, neutralizing amines, or both.

DETAILED DESCRIPTION OF THE INVENTION

The present invention relates to breathable polyurethanes prepared in a preferred process comprising:

(A) reacting to form an isocyanate-terminated prepolymer (1) at least one polyisocyanate having an average of about two or more isocyanate groups; (2) at least one active hydrogen-containing compound comprising (a) poly(alkylene oxide) side-chain units in an amount comprising about 12 wt. % to about 80 wt. % of said polyurethane, wherein (i) alkylene oxide groups in said poly(alkylene oxide) side-chain units have from 2 to 10 carbon atoms and are unsubstituted, substituted, or both unsubstituted and substituted, (ii) at least about 50 wt. % of said alkylene oxide groups are ethylene oxide, and (iii) said amount of said side-chain units is at least about 30 wt. % when the molecular weight of said side-chain units is less than about 600 grams/mole, at least about 15 wt. % when the molecular weight of said side-chain units is from about 600 to about 1,000 grams/mole, and at least about 12 wt. % when the molecular weight of said side-chain units is more than about 1,000 grams/mole, and (b) poly(ethylene oxide) main-chain units in an amount comprising less than about 25 wt. % of said polyurethane; (3) preferably at least one other active hydrogen-containing compound not containing poly(alkylene oxide) side-chain units; and (4) optionally at least one compound having at least one crosslinkable functional group, in order to form an isocyanate-terminated prepolymer;

(B) dispersing said prepolymer in water, and chain extending said prepolymer by reaction with at least one of water, inorganic or organic polyamine having an average of about 2 or more primary and/or secondary amine groups, polyalcohols, ureas, or combinations thereof; and (C) thereafter further processing the chain-extended dispersion of step (B) in order to form a composition or article having an upright moisture vapor transmission rate (MVTR) of more than about 500 gms/m$^2$/24 hr.

Optionally at least one plasticizer is introduced into the reaction mixture at any time during prepolymer formation, before the prepolymer is dispersed in water. It can also be added to a finished dispersion. The process typically is conducted in the substantial absence and preferably in the complete absence of an organic solvent or a diluent other than the plasticizer.

Before continuing with discussion of the preferred process, it is noted that other processes can also be used to manufacture the breathable polyurethanes of the present invention, including but not limited to the following:

1. Dispersing prepolymer by shear forces with emulsifiers (external emulsifiers, such as surfactants, or internal emulsifiers having anionic and/or cationic groups as part of or pendant to the polyurethane backbone, and/or as end groups on the polyurethane backbone).

2. Acetone process. A prepolymer is formed with or without the presence of acetone, MEK, and/or other polar solvents that are non-reactive and easily distilled. The prepolymer is further diluted in said solvents as necessary, and chain extended with an active hydrogen-containing compound. Water is added to the chain-extended polyurethane, and the solvents are distilled off. A variation on this process would be to chain extend the prepolymer after its dispersion into water.

3. Melt dispersion process. An isocyanate-terminated prepolymer is formed, and then reacted with an excess of ammonia or urea to form a low molecular weight oligomer having terminal urea or biuret groups. This oligomer is dispersed in water and chain extended by methylolation of the biuret groups with formaldehyde.

4. Ketazine and ketimine processes. Hydrazines or diamines are reacted with ketones to form ketazines or ketimines. These are added to a prepolymer, and remain inert to the isocyanate. As the prepolymer is dispersed in water, the hydrazine or diamine is liberated, and chain extension takes place as the dispersion is taking place.

5. Continuous process polymerization. An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), optional neutralizing agent, water, and optional chain extender and/or surfactant.

6. Reverse feed process. Water and optional neutralizing agent(s) and/or extender amine(s) are charged to the prepolymer under agitation. The prepolymer can be neutralized before water and/or diamine chain extender are added.

7. Solution polymerization.

8. Bulk polymerization, including but not limited to extrusion processes.

The breathable compositions of the present invention are conveniently referred to as polyurethanes because they contain urethane groups. They can be more accurately described as poly(urethane/urea)s if the active hydrogen-containing compounds are polyols and polyamines. It is well understood by those skilled in the art that "polyurethanes" is a generic term used to describe polymers obtained by reacting isocyanates with at least one hydroxyl-containing compound, amine-containing compound, or mixture thereof. It also is well understood by those skilled in the art that polyurethanes also include allophanate, biuret, carbodiimide, oxazolidinyl, isocyanurate, uretdione, and other linkages in addition to urethane and urea linkages.

As used herein, the term "wt. %" means the number of parts by weight of monomer per 100 parts by weight of polymer on a dry weight basis, or the number of parts by weight of ingredient per 100 parts by weight of specified composition. As used herein, the term "molecular weight" means number average molecular weight.

Polyisocyanates

Suitable polyisocyanates have an average of about two or more isocyanate groups, preferably an average of about two to about four isocyanate groups and include aliphatic, cycloaliphatic, araliphatic, and aromatic polyisocyanates, used alone or in mixtures of two or more. Diisocyanates are more preferred.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl) cyclohexane, and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate), toluene diisocyanate, their isomers, naphthalene diisocyanate, and the like. A preferred aromatic polyisocyanate is toluene diisocyanate.

Active Hydrogen-containing Compounds

The term "active hydrogen-containing" refers to compounds that are a source of active hydrogen and that can react with isocyanate groups via the following reaction: —NCO+H—X→—NH—C(=O)—X. Examples of suitable active hydrogen-containing compounds include but are not limited to polyols, poythiols and polyamines.

As used herein, the term "alkylene oxide" includes both alkylene oxides and substituted alkylene oxides having 2 to 10 carbon atoms. The active hydrogen-containing compounds used in this invention have poly(alkylene oxide) side chains sufficient in amount to comprise about 12 wt. % to about 80 wt. %, preferably about 15 wt. % to about 60 wt. %, and more preferably about 20 wt. % to about 50 wt. %, of poly(alkylene oxide) units in the final polyurethane on a dry weight basis. At least about 50 wt. %, preferably at least about 70 wt. %, and more preferably at least about 90 wt. % of the poly(alkylene oxide) side-chain units comprise poly (ethylene oxide), and the remainder of the side-chain poly (alkylene oxide) units can comprise alkylene oxide and substituted alkylene oxide units having from 3 to about 10 carbon atoms, such as propylene oxide, tetramethylene oxide, butylene oxides, epichlorohydrin, epibromohydrin, allyl glycidyl ether, styrene oxide, and the like, and mixtures thereof. The term "final polyurethane" means the polyurethane produced after formation of the prepolymer followed by the chain extension step as described more fully hereafter.

Preferably such active hydrogen-containing compounds provide less than about 25 wt. %, more preferably less than about 15 wt. % and most preferably less than about 5 wt. % poly(ethylene oxide) units in the backbone (main chain) based upon the dry weight of final polyurethane, since such main-chain poly(ethylene oxide) units tend to cause swelling of polyurethane particles in the waterborne polyurethane dispersion and also contribute to lower in-use tensile strength of articles made from the polyurethane dispersion. Preferably the amount of the side-chain units is (i) at least about 30 wt. % when the molecular weight of the side-chain units is less than about 600 grams/mole, (ii) at least about 15 wt. % when the molecular weight of the side-chain units is from about 600 to about 1,000 grams/mole, and (iii) at least about 12 wt. % when the molecular weight of said side-chain units is more than about 1,000 grams/mole. Mixtures of active hydrogen-containing compounds having such poly (alkylene oxide) side chains can be used with active hydrogen-containing compounds not having such side chains.

Preferably the polyurethanes of the present invention also have reacted therein at least one active hydrogen-containing compound not having said side chains and typically ranging widely in molecular weight from about 50 to about 10,000 grams/mole, preferably about 200 to about 6,000 grams/mole, and more preferably about 300 to about 3,000 grams/mole. Suitable active-hydrogen containing compounds not having said side chains include any of the amines and polyols described hereafter.

The term "polyol" denotes any high molecular weight product having an average of about two or more hydroxyl groups per molecule. Examples of such polyols that can be used in the present invention include higher polymeric polyols such as polyester polyols and polyether polyols, as well as polyhydroxy polyester amides, hydroxyl-containing polycaprolactones, hydroxyl-containing acrylic interpolymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols and hydrogenated polybutadiene polyols, polyacrylate polyols, halogenated polyesters and polyethers, and the like, and mixtures thereof. The polyester polyols, polyether polyols, polycarbonate polyols, polysiloxane polyols, and ethoxylated polysiloxane polyols are preferred.

Poly(alkylene oxide) side chains can be incorporated into such polyols by methods well known to those skilled in the art. For example, active hydrogen-containing compounds having poly(alkylene oxide) side chains include diols having poly(ethylene oxide) side chains such as those described in U.S. Pat. No. 3,905,929 (incorporated herein by reference in its entirety). Further, U.S. Pat. No. 5,700,867 (incorporated herein by reference in its entirety) teaches methods for incorporation of poly(ethylene oxide) side chains at col. 4, line 35 to col. 5, line 45. A preferred active hydrogen-containing compound having poly(ethylene oxide) side chains is trimethylol propane monoethoxylate mether ether, available as Tegomer D-3403 from Degussa-Goldschmidt.

The polyester polyols typically are esterification products prepared by the reaction of organic polycarboxylic acids or their anhydrides with a stoichiometric excess of a diol. Examples of suitable polyols for use in the reaction include poly(glycol adipate)s, poly(ethylene terephthalate) polyols, polycaprolactone polyols, orthophthalic polyols, sulfonated and phosphonated polyols, and the like, and mixtures thereof.

The diols used in making the polyester polyols include alkylene glycols, e.g., ethylene glycol, 1,2- and 1,3-propylene glycols, 1,2-, 1,3-, 1,4-, and 2,3-butylene glycols, hexane diols, neopentyl glycol, 1,6-hexanediol, 1,8-octanediol, and other glycols such as bisphenol-A, cyclohexane diol, cyclohexane dimethanol (1,4-bis-hydroxymethylcycohexane), 2-methyl-1,3-propanediol, 2,2,4-trimethyl-1,3-pentanediol, diethylene glycol, triethylene glycol, tetraethylene glycol, polyethylene glycol, dipropylene glycol, polypropylene glycol, dibutylene glycol, polybutylene glycol, dimerate diol, hydroxylated bisphenols, polyether glycols, halogenated diols, and the like, and mixtures thereof. Preferred diols include ethylene glycol, diethylene glycol, butylene glycol, hexane diol, and neopentyl glycol.

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic or aromatic dibasic acids.

The preferred polyester polyol is a diol. Preferred polyester diols include poly(butanediol adipate); hexane diol adipic acid and isophthalic, acid polyesters such as hexane adipate isophthalate polyester; hexane diol neopentyl glycol adipic acid polyester diols, e.g., Piothane 67-3000 HNA (Panolam Industries) and Piothane 67-1000 HNA; as well as propylene glycol maleic anyhydride adipic acid polyester diols, e.g., Piothane 50-1000 PMA; and hexane diol neopentyl glycol fumaric acid polyester diols, e.g., Piothane 67-500 HNF. Other preferred polyester diols include Rucoflex® S1015-35, S1040-35, and S-1040-110 (Bayer Corporation).

Polyether diols may be substituted in whole or in part for the polyester diols. Polyether polyols are obtained in known manner by the reaction of (A) the starting compounds that contain reactive hydrogen atoms, such as water or the diols set forth for preparing the polyester polyols, and (B) alkylene oxides, such as ethylene oxide, propylene oxide, butylene oxide, styrene oxide, tetrahydrofuran, epichlorohydrin, and the like, and mixtures thereof. Preferred polyethers include poly(propylene glycol), polytetrahydrofuran, and copolymers of poly(ethylene glycol) and poly(propylene glycol).

Polycarbonates include those obtained from the reaction of (A) diols such 1,3-propanediol, 1,4-butanediol, 1,6-hexanediol, diethylene glycol, triethylene glycol, tetraethylene glycol, and the like, and mixtures thereof with (B) diarylcarbonates such as diphenylcarbonate or phosgene.

Polyacetals include the compounds that can be prepared from the reaction of (A) aldehydes, such as formaldehyde and the like, and (B) glycols such as diethylene glycol, triethylene glycol, ethoxylated 4,4'-dihydroxy-diphenyldimethylmethane, 1,6-hexanediol, and the like. Polyacetals can also be prepared by the polymerization of cyclic acetals.

The aforementioned diols useful in making polyester polyols can also be used as additional reactants to prepare the isocyanate terminated prepolymer.

Instead of a long-chain polyol, a long-chain amine may also be used to prepare the isocyanate-terminated prepolymer. Suitable long-chain amines include polyester amides and polyamides, such as the predominantly linear condensates obtained from reaction of (A) polybasic saturated and unsaturated carboxylic acids or their anyhydrides, and (B) polyvalent saturated or unsaturated aminoalcohols, diamines, polyamines, and the like, and mixtures thereof.

Diamines and polyamines are among the preferred compounds useful in preparing the aforesaid polyester amides and polyamides. Suitable diamines and polyamines include 1,2-diaminoethane, 1,6-diaminohexane, 2-methyl-1,5-pentanediamine, 2,2,4-trimethyl-1,6-hexanediamine, 1,12-diaminododecane, 2-aminoethanol, 2-[(2-aminoethyl)amino]-ethanol, piperazine, 2,5-dimethylpiperazine, 1-amino-3-aminomethyl-3,5,5-trimethylcyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, urea, amino acid hydrazides, hydrazides of semicarbazidocarboxylic acids, bis-hydrazides and bis-semicarbazides, diethylene triamine, triethylene tetramine, tetraethylene pentamine, pentaethylene hexamine, N,N,N-tris-(2-aminoethyl)amine, N-(2-piperazinoethyl)-ethylene diamine, N,N'-bis-(2-aminoethyl)-piperazine, N,N,N'-tris-(2-aminoethyl)ethylene diamine, N-[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl)amine, N,N-bis-(2-piperazinoethyl)-amine, polyethylene imines, iminobispropylamine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl)amine, N,N'-bis-(3-aminopropyl)ethylene diamine, and 2,4-bis-(4'-aminobenzyl)-aniline, and the like, and mixtures thereof. Preferred diamines and polyamines include 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, ethylene diamine, diethylene triamine, triethylene tetramine, tetraethylene pentamine, and pentaethylene hexamine, and the like, and mixtures thereof. Other suitable diamines and polyamines include Jeffamine® D-2000 and D-4000, which are amine-terminated polypropylene glycols, differing only by molecular weight, and which are available from Huntsman Chemical Company.

Prepolymer Ratios of Isocyanate to Active Hydrogen

The ratio of isocyanate to active hydrogen in the prepolymer typically ranges from about 1.3/1 to about 2.5/1, preferably from about 1.5/1 to about 2.1/1, and more preferably from about 1.7/1 to about 2/1.

Compounds Having at Least One Crosslinkable Functional Group

Compounds having at least one crosslinkable functional group include those having carboxylic, carbonyl, amine, hydroxyl, and hydrazide groups, and the like, and mixtures of such groups. The typical amount of such optional compound is up to about 1 milliequivalent, preferably from about 0.05 to about 0.5 milliequivalent, and more preferably from about 0.1 to about 0.3 milliequivalent per gram of final polyurethane on a dry weight basis.

The preferred monomers for incorporation into the isocyanate-terminated prepolymer are hydroxy-carboxylic acids having the general formula $(HO)_xQ(COOH)_y$, wherein Q is a straight or branched hydrocarbon radical having 1 to 12 carbon atoms, and x and y are 1 to 3. Examples of such hydroxy-carboxylic acids include citric acid, dimethylolpropanoic acid (DMPA), dimethylol butanoic acid (DMBA), glycolic acid, lactic acid, malic acid, dihydroxymalic acid, tartaric acid, hydroxypivalic acid, and the like, and mixtures thereof. Dihydroxy-carboxylic acids are more preferred with dimethylolpropanoic acid (DMPA) being most preferred.

Other suitable compounds providing crosslinkability include thioglycolic acid, 2,6-dihydroxybenzoic acid, and the like, and mixtures thereof.

Catalysts

The formation of the isocyanate-terminated prepolymer may be achieved without the use of a catalyst. However, a catalyst is preferred in some instances. Examples of suitable catalysts include stannous octoate, dibutyl tin dilaurate, and tertiary amine compounds such as triethylamine and bis-(dimethylaminoethyl) ether, morpholine compounds such as β,β'-dimorpholinodiethyl ether, bismuth carboxylates, zinc bismuth carboxylates, iron (III) chloride, potassium octoate, potassium acetate, and DABCO® (diazabicyclo[2.2.2]octane), from Air Products. The preferred catalyst is a mixture of 2-ethylhexanoic acid and stannous octoate, e.g., FASCAT® 2003 from Elf Atochem North America. The amount of catalyst used is typically from about 5 to about 200 parts per million of the total weight of prepolymer reactants.

Prepolymer Neutralization

Optional neutralization of the prepolymer having pendant carboxyl groups converts the carboxyl groups to carboxylate anions, thus having a water-dispersibility enhancing effect. Suitable neutralizing agents include tertiary amines, metal hydroxides, ammonium hydroxide, phosphines, and other agents well known to those skilled in the art. Tertiary amines and ammonium hydroxide are preferred, such as triethyl amine (TEA), dimethyl ethanolamine (DMEA), N-methyl morpholine, and the like, and mixtures thereof. It is recognized that primary or secondary amines may be used in place of tertiary amines, if they are sufficiently hindered to avoid interfering with the chain extension process.

Chain Extenders

As a chain extender, at least one of water, inorganic or organic polyamine having an average of about 2 or more primary and/or secondary amine groups, polyalcohols, ureas, or combinations thereof is suitable for use in the present invention. Suitable organic amines for use as a chain extender include diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in the present invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable polyalcohols include those having from 2 to 12 carbon atoms, preferably from 2 to 8 carbon atoms, such as ethylene glycol, diethylene glycol, neopentyl glycol, butanediols, hexanediol, and the like, and mixtures thereof. Suitable ureas include urea and it derivatives, and the like, and mixtures thereof. Hydrazine is preferred and is most preferably used as a solution in water. The amount of chain extender typically ranges from about 0.5 to about 0.95 equivalents based on available isocyanate.

Polymer Branching

A degree of branching of the polymer may be beneficial, but is not required to maintain a high tensile strength and improve resistance to creep —that is, recovery to that of or near its original length after stretching. This degree of branching may be accomplished during the prepolymer step or the extension step. For branching during the extension step, the chain extender DETA is preferred, but other amines having an average of about two or more primary and/or secondary amine groups may also be used. For branching during the prepolymer step, it is preferred that trimethylol propane (TMP) and other polyols having an average of about two or more hydroxyl groups be used. The branching monomers can be present in amounts up to about 4 wt. % of the polymer backbone.

Plasticizers

The polyurethane of the present invention can be prepared in the presence of a plasticizer. The plasticizer can be added at any time during prepolymer preparation or dispersion or to the polyurethane during or after its manufacture. Plasticizers well known to the art can be selected for use in this invention according to parameters such as compatibility with the particular polyurethane and desired properties of the final composition, such as those listed in WIPO Publication WO 02/08327 A1 (incorporated herein by reference in its entirety). For example, polyester plasticizers tend to be more compatible with polyester-based polyurethanes. Reactive plasticizers can be used that react with functionality of the ingredients. For example, epoxy groups may be present in reactive plasticizers that react with other compounds such as aminated and hydroxylated compounds respectively. Ethylenically unsaturated groups may be present in reactive plasticizers that react with compounds having ethylenic unsaturation. Plasticizers can also be selected to impart particular properties such as flame retardancy to the polyurethanes, or to enhance particular properties such as wetting, emulsifying, conditioning, and UV absorption in end-use personal care applications. The plasticizers typically are used in amounts from about 2 wt. % to about 100 wt. %, preferably from about 5 to about 50 wt. %, and more preferably from about 5 to about 30 wt. %, based on polyurethane dry weight. The optimum amount of plasticizer is determined according to the particular application, as is well known to those skilled in the art.

Suitable plasticizers include ester derivatives of such acids and anhydrides as adipic acid, azelaic acid, benzoic acid, citric acid, dimer acids, fumaric acid, isobutyric acid, isophthalic acid, lauric acid, linoleic acid, maleic acid, maleic anyhydride, melissic acid, myristic acid, oleic acid, palmitic acid, phosphoric acid, phthalic acid, ricinoleic acid, sebacic acid, stearic acid, succinic acid, 1,2-benzenedicarboxylic acid, and the like, and mixtures thereof. Also suitable are epoxidized oils, glycerol derivatives, paraffin derivatives, sulfonic acid derivatives, and the like, and mixtures thereof and with the aforesaid derivatives. Specific examples of such plasticizers include diethylhexyl adipate, heptyl nonyl adipate, diisodecyl adipate, the adipic acid polyesters sold by Solutia as the Santicizer series, dicapryl adipate, dimethyl azelate, diethylene glycol dibenzoate and dipropylene glycol dibenzoate (such as the K-Flex® esters from Noveon, Inc.), polyethylene glycol dibenzoate, 2,2,4-trimethyl-1,3-pentanediol monoisobutyrate benzoate, 2,2,4-trimethyl-1,3-pentanediol diisobutyrate, methyl (or ethyl, or butyl) phthalyl ethyl glycolate, triethyl citrate, dibutyl fumarate, 2,2,4-trimethyl-1,3-pentanediol diisobutyrate, methyl laurate, methyl linoleate, di-n-butyl maleate, tricapryl trimellitate, heptyl nonyl trimellitate, triisodecyl trimellitate, triisononyl trimellitate, isopropyl myristate, butyl oleate, methyl palmitate, tricresyl phosphate, dimethyl phthalate, diethyl phthalate, dibutyl phthalate, diisobutyl phthalate, di-2-ethylhexyl phthalate, octyl decyl phthalate, diisodecyl phthalate, heptyl nonyl phthalate, diundecyl phthalate, ditridecyl phthalate, dicyclohexyl phthalate, diphenyl phthalate, butyl benzyl phthalates such as the n-butylbenzyl ester of o-phthalic acid, isodecyl benzyl phthalate, alkyl ($C_7/C_9$) benzyl phthalate, dimethoxyethyl phthalate, 7-(2,6,6,8-tetramethyl-4-oxa-3-oxo-nonyl) benzyl phthalate, di-2-ethylhexyl sebacate, butyl ricinoleate, dimethyl sebacate, methyl stearate, diethyl succinate, the butyl phenylmethyl ester of 1,2-benzenedicarboxylic acid, epoxidized linseed oil, glycerol triacetate, chloroparaffins having about 40% to about 70% Cl, o,p-toluenesulfonamide, N-ethyl p-toluene sulfonamide, N-cyclohexyl p-toluene sulfonamide, sulfonamide-formaldehyde resin, and the like, and mixtures thereof. Other suitable plasticizers known to those skilled in the art include castor oil, sunflower seed oil, soybean oil, aromatic petroleum condensate, partially hydrogenated terphenyls, silicone plasticizers such as dimethicone copolyol esters, dimethiconol esters, silicone carboxylates, guerbet esters, and the like, alone or as mixtures with other plasticizers.

Dibenzoate esters are of particular interest in personal care applications as replacements for more hazardous components. Dibenzoate esters increase film flexibility and improve the dried film's resistance to moisture. Suitable dibenzoate esters include those set forth heretofore as well as the preferred p-aminobenzoic acid (PABA) esters, which are known to absorb UV (ultraviolet) radiation in the UVC band or region of the spectrum. UV radiation can eventually cause wrinkles, age spots, and even skin cancer.

The most damaging UV radiation can be divided into three bands: UVA, UVB, and UVC. UVA (about 320 to about 400 nm) penetrates down to the dermis and damages the skin's "elastic substances" (like sunburn or tanning). UVB (280–320 nm) typically is the most destructive form of UV radiation, believed to be the primary cause of sunburn and known to cause skin cancer. UVC (about 200 to about 280 nm) is the shortest, most energetic, and would likely be even more harmful than UVB but is largely filtered by the ozone layer and prevented from reaching the earth's surface. The UVC band is largely filtered by the ozone layer so that it does not reach the earth's surface as readily as the other two bands described below. Plasticizers can be effective in personal care products together with the sunscreens described hereafter in order to reduce radiation exposure in all UV bands.

Examples of suitable reactive plasticizers include compositions and mixtures having ethylenic unsaturation, such as triallyl trimellitate (TATM), Stepanol PD-200LV (a mixture of (1) unsaturated oil and (2) polyester diol reaction product of o-phthalic acid and diethylene glycol from Stepan Company), and the like, and mixtures thereof. Other suitable reactive plasticizers include epoxidized plasticizers, including certain monofunctional and polyfunctional glycidyl ethers such as Heloxy® Modifier 505 (polyglycidyl ether of castor oil) and Heloxy® Modifier 71 (dimer acid diglycidyl ether) from Shell Chemical Company, and the like, and mixtures thereof.

Examples of suitable flame retardant plasticizers include phosphorus-based plasticizers such as cyclic phosphates, phosphites, and phosphate esters, exemplified by Pliabrac™ TCP (tricresyl phosphate), Pliabrac™ TXP (trixylenyl phosphate), Antiblaze™ N (cyclic phosphate esters), Antiblaze™ TXP (tar acid, cresol, xylyl, phenol phosphates), and Antiblaze™ 524 (trixylyl phosphate) from Albright & Wilson Americas; Firemaster™ BZ 54 (halogenated aryl esters) from Great Lakes Chemicals; chlorinated biphenyl, 2-ethylhexyl diphenyl phosphate, isodecyl diphenyl phosphate, triphenyl phosphate, cresyl diphenyl phosphate, p-t-butylphenyl diphenyl phosphate, triphenyl phosphite, and the like. Other examples of phosphorus-based plasticizers include chlorinated alkyl phosphate esters such as Antiblaze™ 100 (chloro alkyl diphosphate ester) from Albright & Wilson Americas; alkyl phosphates and phosphites such as tributyl phosphate, tri-2-ethylhexyl phosphate, and triisoctyl phosphite; other organophosphates and organophosphites such as tributoxy ethylphosphate; other phosphates and phosphonates such as chlorinated diphosphate and chlorinated polyphosphonate; and the like. Mixtures can also be used.

Examples of suitable wetting, emulsifying, and conditioning plasticizers include alkyloxylated fatty alcohol phosphate esters such as oleth-2 phosphate, oleth-3 phosphate, oleth-4 phosphate, oleth-10 phosphate, oleth-20 phosphate, ceteth-8 phosphate, ceteareth-5 phosphate, ceteareth-10 phosphate, PPG ceteth-10 phosphate, and the like, and mixtures thereof.

Other Additives for Preparation of Dispersions

Other additives well known to those skilled in the art can be used to aid in preparation of the dispersions of this invention. Such additives include surfactants, stabilizers, defoamers, antimicrobial agents, antioxidants, UV absorbers, carbodiimides, and the like. The dispersions of this invention typically have total solids of at least about 20 wt. %, preferably at least about 25 wt. % and more preferably at least about 30 wt. %.

Overview of Applications

The waterborne polyurethane dispersions of the present invention can be processed by methods well known to those skilled in the art (including blending with other polymers and materials) to make coatings and films and other articles having excellent breathability, i.e., moisture vapor transmission rates ("MVTR"). Suitable MVTR's typically are an upright MVTR of at least about 500 grams/m²/24 hours, preferably at least about 600 grams/m²/24 hours, and more preferably at least about 700 grams/m²/24 hours grams/m²/24 hours. The term "breathable" is used herein to denote such excellent MVTR. Similarly, the term "breathability" is used as an indication of the MVTR of a particular composition or article and is described more particularly as excellent (above about 500 grams/m²/24 hours) or inferior (below about 500 grams/m²/24 hours).

Additives such as activators, curing agents, stabilizers such as Stabaxol™ P200, colorants, pigments, neutralizing agents, thickeners, non-reactive and reactive plasticizers, coalescing agents such as di(propylene glycol) methyl ether (DPM), waxes, slip and release agents, antimicrobial agents, surfactants such as Pluronic™ F68-LF and IGEPAL™ CO630 and silicone surfactants, metals, antioxidants, UV stabilizers, antiozonants, and the like, can optionally be added as appropriate before and/or during the processing of the dispersions of this invention into finished products as is well known to those skilled in the art. Additives may be used as appropriate in order to make articles or to treat (such as by impregnation, saturation, spraying, coating, or the like)

porous and non-porous substrates such as papers, non-woven materials, textiles, leather, wood, concrete, masonry, metals, house wrap and other building materials, fiberglass, polymeric articles, personal protective equipment (such as hazardous material protective apparel, including face masks, medical drapes and gowns, and firemen's turnout gear), and the like. Applications include papers and non-wovens; fibrous materials; films, sheets, composites, and other articles; inks and printing binders; flock and other adhesives; and personal care products such as skin care, hair care, and nail care products; livestock and seed applications; and the like.

Any fibrous material can be coated, impregnated or otherwise treated with the compositions of the present invention by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

The compositions of the present invention can be used as adhesives or to augment or supplement adhesive types well known to those skilled in the art. For example, particular adhesive properties can be achieved by varying type and amount of isocyanate(s); type, amount, and molecular weight of polyol(s); and amount of poly(alkylene oxide) side chain units. Compounding with other ingredients is well understood by those skilled in the art.

Blends with Other Polymers and Polymer Dispersions

The waterborne polyurethane dispersions and final (dry) polyurethanes of the present invention can be combined with commercial polymers and polymer dispersions by methods well known to those skilled in the art. Such polymers and dispersions include those described in WIPO Publication WO 02/02657 A2 (incorporated herein by reference in its entirety). Blending can be done by simple mechanical mixing of dispersions or emulsions, or by dispersing prepolymer(s) into a pre-made dispersion or emulsion of another polymer to form a composite or hybrid of various architectures. Such other polymers and polymer dispersions include natural rubber, conjugated-diene-containing polymers including butadiene-containing copolymers with acrylonitrile and/or styrene (such as Hycar® nitrile copolymer emulsions and SBR copolymer emulsions from Noveon, Inc.), polychlorobutadiene (Neoprene), hydrogenated styrene-butadiene triblock copolymers (such as Kraton™ copolymers from Shell Chemical), chlorosulfonated polyethylene (such as Hypalon™ polymers from E.I. duPont), ethylene copolymers (such as EPDM copolymers), acrylic and/or methacrylic ester copolymers (such as Hycar® acrylic copolymers from Noveon, Inc.), vinyl chloride and vinylidene chloride copolymers (such as Vycar® copolymers from Noveon, Inc.), polyisobutylenes, polyurethanes (such as Sancure® polyurethanes from Noveon, Inc.), polyureas, and poly(urethane-urea)s. Among preferred compositions are those comprising acrylic copolymers and polyurethanes.

Suitable compositions include those described in the following U.S. patents, all of which are incorporated herein by reference. For example, U.S. Pat. No. 4,920,176 relates to emulsion polymerization in order to prepare nitrile rubber (NBR) latexes. Generally, nitrile latexes comprise polymerized units of butadiene, acrylonitrile, and acrylic acid or methacrylic acid. Additional comonomers can be included to change or improve polymer properties. These include vinylpyridine, acrylic and methacrylic ester monomers, chlorobutadiene, cross-linking agents, styrenic monomers, and the like.

A review article by D. P. Tate and T. W. Bethea, Encyclopedia of Polymer Science and Engineering, Vol. 2, p.537, further describes polymers and copolymers of conjugated dienes such as butadiene rubber (BR), acrylate-butadiene rubber (ABR), chloroprene rubber (CR), isoprene rubber (IR), and styrene-butadiene rubber (SBR).

U.S. Pat. Nos. 4,292,420 and 6,020,438 relate to emulsion polymerization in order to prepare vinyl chloride latexes. Rigid polyvinylchloride can be softened by the use of plasticizers, such as phthalate and phosphate esters, or by copolymerizing vinyl chloride with "soft" monomers (the so-called internal plasticization monomers), which render soft copolymers with vinyl chloride. Such "soft" monomers include long-chain acrylic and methacrylic esters, vinyl esters, vinyl ethers, acrylamides, and methacrylamides, and are exemplified by butyl acrylate, 2-ethylhexyl methacrylate, vinyl propionate, n-octylacrylamide and the like.

U.S. Pat. No. 6,017,997 relates to preparation of waterborne polyurethane, polyurea, and poly(urethane-urea) dispersions ("PUD"). Generally PUD comprises polymerized units of diisocyanate and hydrophylic moiety, together with diol, diamine, or both diol and diamine. However, all four units can have pre-polymerization functionality (i.e., number of reactive groups) higher than two. Diisocyanates can be aliphatic, such as 1,6-hexamethylene diisocyanate, cyclohexane-1,4 (or -1,3)-diisocyanate, isophorone diisocyanate, bis-(4-isocyanatocyclohexyl)-methane, 1,3- and 1,4-bis(isocyanatomethyl)cyclohexane, bis-(4-isocyanato-3-methyl-cyclohexyl)-methane, tetramethyl xylylene diisocyanate, and the like. Diisocyanates can also be aromatic, such as 2,4-diisocyanato toluene, 2,6-diisocyanato toluene, 4,4'-diisocyanato diphenyl methane, and the like.

Personal Care Applications

The waterborne polyurethane dispersions of the present invention are desirable in personal care compositions because of negative customer perceptions regarding the presence of NMP, especially in skin care products such as cosmetics. The waterborne polyurethane dispersions can be used as film formers in personal care formulations to provide desirable properties such as the following: water or moisture resistance, luster, better spreadability of sunscreen actives, and the like. Such dispersions can be incorporated into personal care products such as daily skin care products (cosmetics, lip balms, moisturizers, eye-lash liners, lipsticks, lip balms, sunscreens, and the like), as well as nail care products, hair care products, and the like. Such personal care products can be lotions, gels, sprays, sticks, compressed liquids, liquid suspensions, and the like.

Personal care compositions can include the waterborne polyurethane dispersions of this invention, mixed and optionally reacted further with a topically acceptable phase. The term "topically acceptable phase" means any combination of optional liquid or solid ingredients suitable for a desired personal care composition in combination with (and sometimes reacted with) the plasticized waterborne polyurethane dispersions described heretofore. Such optional ingredients can comprise one or more of a wide variety of components well known to those skilled in the art, such as chelators, conditioners, diluents, fragrances, humectant skin or hair conditioners, lubricants, moisture barriers/emollients, neutralizers, opacifiers, pharmaceutical actives, preservatives, solvents, spreading aids, sunscreens, surfactants, conditioning polymers, vitamins, viscosity modifiers/emulsifiers, and the like, as well as numerous other optional components for enhancing and maintaining the properties of the personal care compositions. Exemplary skin care compositions utilizing such components include those of U.S Pat. Nos. 5,073,372, 5,380,528, 5,599,549, 5,874,095, 5,883,085, 6,013,271, and 5,948,416, all incorporated herein by reference. Such components are also described in detail in well known references such as Mitchell C. Schlossman, *The Chemistry and Manufacture of Cosmetics*, Volumes I and II, Allured Publishing Corporation, 2000.

Suitable chelators include EDTA (ethylene diamine tetraacetic acid) and salts thereof such as disodium EDTA, citric acid and salts thereof, cyclodextrins, and the like, and mixtures thereof. Such suitable chelators typically comprise about 0.001 wt. % to about 3 wt. %, preferably about 0.01 wt. % to about 2 wt. %, and more preferably about 0.01 wt. % to about 1 wt. % of the total weight of the personal care compositions of the present invention.

A diluent such as water (often deionized) can be used and typically comprises about 5 wt. % to about 99 wt. %, and preferably about 20 wt. % to about 99 wt. % of the total weight of the personal care compositions of the present invention.

Suitable humectant skin and/or hair conditioners include allantoin; pyrrolidonecarboxylic acid and its salts; hyaluronic acid and its salts; sorbic acid and its salts; urea; lysine, arginine, cystine, guanidine, and other amino acids; polyhydroxy alcohols such as glycerin, propylene glycol, hexylene glycol, hexanetriol, ethoxydiglycol, dimethicone copolyol, and sorbitol, and the esters thereof; polyethylene glycol; glycolic acid and glycolate salts (e.g. ammonium and quaternary alkyl ammonium); lactic acid and lactate salts (e.g. ammonium and quaternary alkyl ammonium); sugars and starches; sugar and starch derivatives (e.g. alkoxylated glucose); D-panthenol; lactamide monoethanolamine; acetamide monoethanolamine; and the like, and mixtures thereof. Preferred humectants include the $C_3$–$C_6$ diols and triols, such as glycerin, propylene glycol, hexylene glycol, hexanetriol, and the like, and mixtures thereof. Such suitable humectants typically comprise about 1 wt. % to about 10 wt. %, preferably about 2 wt. % to about 8 wt. %, and more preferably about 3 wt. % to about 5 wt. % of the total weight of the personal care compositions of the present invention.

Suitable lubricants include volatile silicones, such as cyclic or linear polydimethylsiloxanes, and the like. The number of silicon atoms in cyclic silicones preferably is from about 3 to about 7 and more preferably 4 or 5. Exemplary volatile silicones, both cyclic and linear, are available from Dow Corning Corporation as Dow Corning 344, 345 and 200 fluids; Union Carbide as Silicone 7202 and Silicone 7158; and Stauffer Chemical as SWS-03314.

The linear volatile silicones typically have viscosities of less than about 5 cP at 25° C., while the cyclic volatile silicones typically have viscosities of less than about 10 cP at 25° C. "Volatile" means that the silicone has a measurable vapor pressure. A description of volatile silicones can be found in Todd and Byers, "Volatile Silicone Fluids for Cosmetics", Cosmetics and Toiletries, Vol. 91, January 1976, pp. 27–32, incorporated herein by reference. Other suitable lubricants include polydimethylsiloxane gums, aminosilicones, phenylsilicones, polydimethyl siloxane, polydiethylsiloxane, polymethylphenylsiloxane, polydimethylsiloxane gums, polyphenyl methyl siloxane gums, amodimethicone, trimethylsiloxyamodimethicone, diphenyl-dimethyl polysiloxane gums, and the like. Mixtures of lubricants can also be used. Such suitable lubricants typically comprise about 0.10 wt. % to about 15 wt. %, preferably about 0.1 wt. % to about 10 wt. %, and more preferably about 0.5 wt. % to about 5 wt. % of the total weight of the personal care compositions of the present invention.

Suitable moisture barriers and or emollients include mineral oil; stearic acid; fatty alcohols such as cetyl alcohol, cetearyl alcohol, myristyl alcohol, behenyl alcohol, and lauryl alcohol; cetyl acetate in acetylated lanolin alcohol, isostearyl benzoate, dicaprylyl maleate, caprylic and capric triglyceride; petrolatum, lanolin, coco butter, shea butter, beeswax and esters there of; ethoxylated fatty alcohol esters such as ceteareth-20, oleth-5, and ceteth-5; avocado oil or glycerides; sesame oil or glycerides; safflower oil or glycerides; sunflower oil or glycerides; botanical seed oils; volatile silicone oils; non-volatile emollients, and the like, and mixtures thereof. Suitable non-volatile emollients include fatty acid and fatty alcohol esters, highly branched hydrocarbons, and the like, and mixtures thereof. Such fatty acid and fatty alcohol esters include decyl oleate, butyl stearate, myristyl myristate, octyldodecyl stearoylstearate, octylhydroxystearate, di-isopropyl adipate, isopropyl myristate, isopropyl palmitate, ethyl hexyl palmitate, isodecyl neopentanoate $C_{12}$–$C_{15}$ alcohol benzoate, diethyl hexyl maleate, PPG-14 butyl ether and PPG-2 myristyl ether propionate, cetearyl octanoate, and the like, and mixtures thereof. Suitable highly branched hydrocarbons include isohexadecane and the like, and mixtures thereof. Such suitable moisture barriers and/or emollients, alone or in combination, typically comprise about 1 wt. % to about 20 wt. %, preferably about 2 wt. % to about 15 wt. %, and more preferably about 3 wt. % to about 10 wt. % of the total weight of the personal care compositions of the present invention.

Suitable neutralizers include triethanolamine,. aminomethyl propanol, ammonium hydroxide, sodium hydroxide, other alkali hydroxides, borates, phosphates, pyrophosphates, cocamine, oleamine, diisopropanolamine, diisopropylamine, dodecylamine, PEG-15 cocamine, morpholine, tetrakis(hydroxypropyl)ethylenediamine, triamylamine, triethanolamine, triethylamine, tromethamine (2-Amino-2-Hydroxymethyl-1,3-propanediol, and the like, and mixtures thereof. Such suitable neutralizers typically comprise about 0 wt. % to about 3 wt. %, preferably about 0.01 wt. % to about 2 wt. %, and more preferably about 0.1 wt. % to about 1 wt. % of the total weight of the personal care compositions of the present invention.

Suitable opacifiers include glycol fatty acid esters; alkoxylated fatty acid esters; fatty acid alcohols; hydrogenated fatty acids, waxes and oils; kaolin; magnesium silicate; titanium dioxide; silica; and the like, and mixtures thereof. Such suitable opacifiers typically comprise about 0.1 wt. % to about 8 wt. %, preferably about 0.5 wt. % to about 6 wt. %, and more preferably about 1 wt. % to about 5 wt. % of the total weight of the personal care compositions of the present invention.

Suitable pharmaceutical actives useful in the present invention include any chemical substance, material or compound suitable for topical administration to induce any desired local or systemic effect. Such actives include, but are not limited to antibiotics, antiviral agents, analgesics (e.g. ibuprofen, acetyl salicylic acid, naproxen, and the like), antihistamines, anti-inflammatory agents, antipruritics, antipyretics, anesthetic agents, diagnostic agents, hormones, antifungals, antimicrobials, cutaneous growth enhancers, pigment modulators, antiproliferatives, antipsoriatics, retinoids, anti-acne medicaments (e.g. benzoyl peroxide, sulfur, and the like), antineoplastics agents, phototherapeutic agents, and keratolytics (e.g. resorcinol, salicylic acid, and the like), and the like, and mixtures thereof. Such pharmaceutical actives typically comprise about 0.1 wt. % to about 20 wt. % of the total weight of the personal care compositions of the present invention.

Suitable preservatives include polymethoxy bicyclic oxazolidine, methylparaben, propylparaben, ethylparaben, butylparaben, benzoic acid and the salts of benzoic acid, benzyltriazole, DMDM hydantoin (also known as 1,3-dimethyl-5,5-dimethyl hydantoin), imidazolidinyl urea, phenoxyethanol, phenoxyethylparaben, methylisothiazolinone, methylchloroisothiazolinone, benzoisothiazolinone, triclosan, sorbic acid, salicylic acid salts, and the like, and mixtures thereof. Such suitable preservatives typically comprise about 0.01 wt. % to about 1.5 wt. %, preferably about 0.1 wt. % to about 1 wt. %, and more preferably about 0.3 wt. % to about 1 wt. % of the total weight of the personal care compositions of the present invention.

Suitable spreading aids include hydroxypropyl methylcellulose, hydrophobically modified cellulosics, xanthan gum, cassia gum, guar gum, locust bean gum, dimethicone copolyols of various degrees of alkoxylation, boron nitride, talc, and the like, and mixtures thereof. Such suitable spreading aids typically comprise about 0.01 wt. % to about 5 wt. %, preferably about 0.1 wt. % to about 3 wt. %, and more preferably about 0.1 wt. % to about 2.0 wt. % of the total weight of the personal care compositions of the present invention.

Suitable sunscreens can be used in safe and photoprotectively effective amounts in the personal care compositions of the present invention. Suitable sunscreens include those set forth in Segarin et al., *Cosmetics Science and Technology*, at Chapter VIII, pages 1890 et seq. seq., as well as 64 Fed. Reg. 27666–27693 (May 21, 1999). Specific suitable sunscreening agents include, for example, p-aminobenzoic acid and its salts and derivatives (ethyl, isobutyl, glyceryl esters; p-dimethylaminobenzoic acid; 2-ethylhexyl-N,N-dimethylaminobenzoate); anthranilates (i.e., o-aminobenzoates; methyl, octyl, amyl, menthyl, phenyl, benzyl, phenylethyl, linalyl, terpinyl, and cycohexenyl esters); salicylates (octyl, amyl, phenyl, benzyl, menthyl, glyceryl, and dipropyleneglycol esters); cinnamic acid derivatives (ethylhexyl-p-methoxy; menthyl and benzyl esters, phenyl cinnamonitrile; butyl cinnamoyl pyruvate); dihydroxycinnamic acid derivatives (umbelliferone, methylumbelliferone, methylaceto-umbelliferone); trihydroxycinnamic acid derivatives (esculetin, methylesculetin, daphnetin, and the glucosides, esculin and daphnin); hydrocarbons (diphenylbutadiene, stilbene); dibenzalacetone and benzalacetophenone; naphtholsulfonates (sodium salts of 2-naphthol-3,6-disulfonic and of 2-naphthol-6,8-disulfonic acids); dihydroxy-naphthoic acid and its salts; o- and p-hydroxybiphenyldisulfonates; coumarin derivatives (7-hydroxy, 7-miethyl, 3-phenyl); diazoles (2-acetyl-3-bromoindazole, phenyl benzoxazole, methyl naphthoxazole, various aryl benzothiazoles); quinine salts (bisulfate, sulfate, chloride, oleate, and tannate); quinoline derivatives (8-hydroxyquinoline salts, 2-phenyl quinoline); hydroxymethoxy-substituted benzophenones; uric and vilouric acids; tannic acid and its derivatives (e.g. hexaethylether); (butyl carbityl) (6-propyl piperonyl) ether; hydroquinone; benzophenones (oxybenzone, sulisobenzone, dioxybenzone, benzoresorcinol, 2,2',4,4'-tetrahydroxybenzophenone, 2,2'-dihydroxy-4,4'-dimethoxybenzophenone, octabenzone; 4-isopropyldibenzoylmethane; butylmethoxyldibenzoylmethane; octocrylene; 4-isopropyl-dibenzoylmethane; and camphor derivatives such as methylbenzylidene or benzylidene camphor; and the like, and mixtures thereof. Other sunscreens include the inorganic sunblocks such as titanium dioxide (micronized titanium dioxide, 0.03 microns), zinc oxide, silica, iron oxide and dioxide, and the like, and mixtures thereof with one another and with the aforementioned organic sunscreens. Without being limited by theory, it is believed that these inorganic materials provide a sunscreening benefit through reflecting, scattering, and absorbing harmful UV, visible, and infrared radiation. Particularly useful are the sunscreens ethylhexyl-p-methoxycinnamate, octyl salicylate and benzophenone, either alone, as a mixture, or in combination with the physical sunscreen titanium dioxide.

By "safe and photoprotectively" is meant an amount of sunscreen sufficient to provide photoprotection when the composition is applied, but not so much as to cause any side effects such as skin reactions. Suitable sunscreens typically comprise about 0.5 wt. % to about 50 wt. %, preferably about 0.5 wt. % to about 30 wt. %, and more preferably about 0.5 wt. % to about 20 wt. % of the total weight of the skin care compositions of the present invention. Exact amounts will vary depending upon the sunscreen chosen and the desired Sun Protection Factor (SPF).

SPF is a commonly used measure of photoprotection of a sunscreen against erythema. This number is derived from another parameter, the minimal erythemal dose (MED). MED is defined as the least exposure dose at a specified wavelength that will elicit a delayed erythema response. The MED indicates the amount of energy reaching the skin and the responsiveness of the skin to the radiation. The SPF of a particular photoprotector is obtained by dividing the MED of protected skin by the MED of unprotected skin. The higher the SPF, the more effective the agent in preventing sunburn. The SPF value tells how many times longer a person can stay in the sun with use of the sunscreen (compared to the same person with unprotected skin) before that person will experience 1 MED. For example, utilizing a sunscreen with an SPF of 6 will allow an individual to stay in the sun six times longer before receiving MED. As the SPF value of a sunscreen increases, a lesser chance exists for development of tanning of the skin. Commercially available sunscreening products have SPF values ranging from 2 to 50.

Suitable surfactants include a wide variety of nonionic, cationic, anionic, and zwitterionic surfactants, such as those disclosed in *McCutcheon's Detergents and Emulsifiers*, North American Edition (1986), Allured Publishing Corporation; and in U.S. Pat. Nos. 3,755,560, 4,421,769, 4,704, 272, 4,741,855, 4,788,006, and 5,011,681. Examples of suitable surfactants include silicone esters, alkyl and alkenyl sulfates; alkyl and alkenyl ethoxylated sulfates (preferably having an average degree of ethoxylation from 1 to about 10); succinamate surfactants such as alkylsulfosuccinamates and dialkyl esters of sulfosuccinic acid; neutralized fatty acid esters of isethionic acid; and alkyl and alkenyl sulfonates, such as olefin sulfonates and beta-alkoxy alkane sulfonates; and the like. Preferred are alkyl and alkenyl sulfates and alkyl and alkenyl ethoxylated sulfates, such as the sodium and ammonium salts of $C_{12}$–$C_{18}$ sulfates and ethoxylated sulfates with a degree of ethoxylation from 1 to about 6, and more preferably from 1 to about 4, such as lauryl sulfate and laureth (3.0) sulfate sodium 3-dodecylaminopropionate; N-alkyltaurines such as prepared by reacting dodecylamine with sodium isethionate according to the teaching of U.S. Pat. No. 2,658,072; N-higher alkyl aspartic acids such as produced according to the teaching of U.S. Pat. No. 2,438,091; and the products sold under the trade name "Miranol" and described in U.S. Pat. No. 2,528,378; and the like. Other suitable surfactants include alkyl (preferably $C_6$–$C_{22}$ and more preferably $C_8$–$C_{12}$) amphoglycinates; alkyl (preferably $C_6$–$C_{22}$ and more preferably $C_8$–$C_{12}$) amphopropionates; and the like. Mixtures can also be used.

Suitable zwitterionic surfactants for use in the present compositions include those broadly described as derivatives of aliphatic quaternary ammonium, phosphonium, and sulfonium compounds, wherein which the aliphatic radicals can be straight chain or branched, and wherein one of the aliphatic substituents contains from about 8 to about 18 carbon atoms and another substituent contains an anionic water-dispersibility enhancing group, such as carboxy, sulfonate, sulfate, phosphate, phosphonate, and the like. Classes of zwitterionics include alkyl amino sulfonates, alkyl betaines and alkyl amido betaines, stearamido propyl dimethyl amine, diethyl amino ethyl stearamide, dimethyl stearamine, dimethyl soyamine, soyamine, myristyl amine, tridecyl amine, ethyl stearylamine, N-tallowpropane diamine, ethoxylated (5 moles ethylene oxide) stearylamine, dihydroxy ethyl stearylamine, arachidylbehenylamine, and the like. Mixtures can also be used. Such suitable surfactants typically comprise about 0.1 wt. % to about 25 wt. %, preferably about 0.5 wt. % to about 25 wt. %, and more preferably about 1 wt. % to about 15 wt. % of the total weight of the personal care compositions of the present invention.

Suitable viscosity adjusters include isopropyl alcohol, ethanol, sorbitol, propylene glycol, diethylene glycol, triethylene glycol, dimethyl ether, butylene glycol, and the like, and mixtures thereof. Such suitable viscosity adjusters typically comprise about 0.1 wt. % to about 60 wt. %, preferably about 1 wt. % to about 40 wt. %, and more preferably about 5 wt. % to about 20 wt. % of the total weight of the personal care compositions of the present invention.

Skin conditioning polymers include quaternized guar gum, quaternized cellulosics, polyquaternium 4, polyquaternium 7, polyquaternium 10, polyquaternium 11, polyquaternium 39, polyquaternium 44, and the like, and mixtures thereof. Such suitable conditioning agents typically comprise about 0.01 wt. % to about 3 wt. %, preferably about 0.1 wt. % to about 2 wt. %, and more preferably about 0.1 wt% to about 0.5 wt. % of the total weight of the skin care compositions of the present invention.

Various vitamins also can be included in the compositions of the present invention. Suitable vitamins include vitamin A, vitamin B, biotin, pantothenic acid, vitamin C, vitamin D, vitamin E, tocopherol acetate, retinyl palmitate, magnesium ascorbyl phosphate, and the like, and derivatives and mixtures thereof.

Suitable viscosity modifiers/emulsifiers include natural, semi-synthetic, and synthetic polymers. Examples of natural and modified natural polymers include xanthan gums, cellulosics, modified cellulosics, starches, polysaccharides, and the like. Examples of synthetic polymers include crosslinked polyacrylates, alkali swellable emulsion acrylate copolymers, hydrophobically modified alkali swellable copolymers, hydrophobically modified non-ionic polyurethanes, and the like. Mixtures can also be used. Such suitable viscosity modifiers/emulsifiers, alone or in combination, typically comprise about 0.1 wt. % to about 5 wt. %, preferably about 0.3 wt. % to about 3 wt. %, and more preferably about 0.5 wt. % to about 2 wt. % of the total weight of the personal care compositions of the present invention.

Other optional components can be used in order to maintain and enhance the properties of personal care compositions. Such optional components include various antioxidants, agents suitable for aesthetic purposes, such as fragrances, pigments, and colorings, and the like.

The following examples are presented for the purpose of illustrating the invention disclosed herein in greater detail. However, the examples are not to be construed as limiting the invention herein in any manner, the scope of the invention being defined by the appended claims.

EXAMPLES

Chemicals Used in Examples
DBA=dibutylamine from Air Products and Chemicals
DeeFo 97–3=defoamer from Ultra Additives
DeeFo XHD-47J=defoamer from Ultra Additives Inc.
Desmodur W=1,1'-methylenebis-(4-isocyanato cyclohexane) from Bayer Corporation
Diethanolamine from Aldrich Chemical Company, Inc.
DF-58=defoamer from Air Products and Chemicals
Dow 345 silicone oil from Dow Corning
DMPA=dimethylolpropanoic acid from Geo Specialty Chemicals Inc.
FASCAT® 2003=2-ethylhexanoic acid and stannous octoate from Elf Atochem North America
HCl=hydrochloric acid from J. T. Baker
Hycar® 2671=acrylic emulsion copolymer from Noveon, Inc.
Hydrazine solution=35 wt. % solution in water from Bayer Corporation
IPDI=isophorone diisocyanate from Bayer Corporation.
KF-6001=hydroxyl terminated polymethylsiloxane triblock copolymer from Shin Etsu
MDI=4,4'-diphenylmethylene diisocyanate
MPEG 550=Carbowax™ Sentry™ methoxypolyethylene glycol 550 (number average MW=550) from The Dow Chemical Company
MPEG 2000=Carbowax™ Sentry™ methoxypolyethylene glycol 2000 (number average MW=2000) from The Dow Chemical Company
Poly G-2177=polyethylene glycol (average MW=1450) from Arch Chemical
PPG-1025=polypropylene glycol (average MW=1025) from Bayer Corporation
PPG-2025=polypropylene glycol (average MW=2025) from Bayer Corporation
Printrite PM=polyurethane associative thickener from Noveon, Inc.
PTHF 1000=polytetrohydrofuran (average MW=1,000) from BASF
PTHF 2000=polytetrohydrofuran (average MW=2,000) from BASF
Rucoflex S-102–210=poly(butanediol adipate) from Bayer Corporation
Sunflower seed oil=Lipovol Sun from Lipo Chemicals
TDI=toluene diisocyanate from Bayer Corporation
Tegomer D-3403=trimethylol propane monoethoxylate methyl ether (number average MW=1,220) from Degussa-Goldschmidt
TMP=trimethylolpropane from Celanese
X-22–160AS silicone from Shin Etsu
67–1000 HNA=hexane neopentyl adipate polyester (average MW=1,000) from Panolam Industries
67–3000 HNA=hexane neopentyl adipate polyester (average MW=3,000) from Panolam Industries 70–500 HAI=hexane adipate isophthalate polyester (average MW=500) from Panolam Industries
500 DI=diethylene glycol isophthalate polyester (average MW=500) from Panolam Industries Test Methods 1. Moisture Vapor Transmission Rate (MVTR). Each dispersion in the examples was prepared for testing by adding approximately 150 grams of polyurethane dispersion to an 8 oz. glass jar, followed by about 5 grams Printrite PM in order to create a thickened polyurethane. (The actual amount of dispersion and Printrite PM varied in a range of about 145–160 grams and about 4.5–6.0 grams respectively in order to achieve sufficient viscosity for knife coating purposes. The mixture was stirred using a Caframo RZR50 lab stirrer equipped with a 1-inch marine impeller until thickening maximized, which normally took about 10–15 minutes.

Each coated fabric sample was prepared using an approximate 18 in.×10 in. swatch of Style 306A Filament Nylon 6,6 Semi-Dull Taffeta from Testafabrics Inc. The swatch was mounted and stretched on a pin frame having springs to apply tension to the fabric. A thin coat (typically about 0.15 to 0.20 oz./yard$^2$) of the thickened polyurethane dispersion was applied to the entire available surface of stretched fabric using a floating/tight knife. The entire assembly (pin frame and mounted, stretched, coated swatch) was placed in a circulating air oven at 212° F. until dry (typically about 5 to about 15 minutes). The fabric (still mounted on the pin frame) was stretched over an elevated glass plate on an aluminum frame. A 2-millimeter thickness of the thickened polyurethane dispersion was applied using a Bird applicator, typically by drawing the applicator over the fabric twice. The pin frame was placed again in the 212° F. circulating air oven and dried. The dried fabric (having coating on it) was removed from the pin frame and dried further (including crosslinking when a crosslinking agent was used) for 5 minutes at 300° F. The final dried test specimen (fabric with coating) typically had about 0.5 to about 1.25 oz/yard$^2$ of dried polyurethane coating.

The following procedure was used to measure rate of transmission of moisture vapor through a membrane (Moisture Vapor Transmission Rate or MVTR) for each of the dried, coated test specimens. A 4 oz. Ball mason jar was filled with demineralized water to within ½ inch of the jar's top. The jar mouth was coated with silicone grease. A 3 inch×3 inch test specimen (larger than the diameter of the jar mouth) was placed across the greased jar mouth with the coated (using the polyurethane being tested) side of the specimen facing the inside of the jar. The test specimen was locked into place across the jar mouth using a gasketed screwtop lid having a circular opening. The complete assembly (jar, water, gasket, lid and test specimen) was weighed and placed in a conditioned room (about 72° F. and 50% relative humidity). A fan was used to blow air across the jar at about 500–575 linear feet per minute for the appropriate time interval (typically 24 hours). The jar was allowed to sit upright so that the test specimen was exposed to the moist atmosphere above the water inside the jar as a test of upright MVTR. The entire assembly was reweighed following the appropriate time interval, and moisture vapor transmission rate was calculated as grams of water lost per square meter of test specimen surface exposed to water vapor per unit of time (typically grams per square meter per 24 hours, or gms/m$^2$/24 hr).

2. Brookfield Viscosity. Brookfield viscosity testing was performed using a Brookfield RV viscometer and spindles #3 to #6 (depending on viscosity) at 20 rpm and about 77° F.

Overview of MVTR Test Results for Examples 1–34

Each of the polyurethanes from Examples 1–14 was tested for upright moisture vapor transmission rate (MVTR), and the test results are summarized in the corresponding Examples 1–14 in Table 1. Example 1 demonstrate the effect of poly(ethylene oxide) side-chain content below the minimum requirement of this invention in producing coatings having inferior breathability (below about 500 grams/m$^2$/24 hours). Examples 2–14 demonstrate production of polyurethane dispersions that were found to be useful in making the coatings of the present invention having excellent breathability (above about 500 grams/m$^2$/24 hours).

Examples 15–17 produced unsatisfactory results (delamination of the coating from the fabric during MVTR testing, a layered dispersion, and excessive viscosity, respectively) because amounts of poly(ethylene oxide) units in the main polyurethane chain were outside the scope of the present invention.

Examples 18–25 and 27 demonstrate demonstrate production of polyurethane dispersions that were found to be useful in making the coatings of the present invention having excellent breathability (above about 500 grams/m$^2$/24 hours).

Example 26 demonstrates production of a polyurethane dispersion that produced a coating having inferior breathability (below about 500 grams/m$^2$/24 hours) because the poly(ethylene oxide) side-chain molecular weight and amount were below 600 g/mole and 30 wt. % (based on dry polyurethane weight) respectively.

Example 28 demonstrates blending of a polyurethane of the present invention with an acrylic copolymer to produce a composition having excellent breathability compared to the acrylic copolymer alone. Such a blend can be used to produce breathable textile coatings.

Examples 29 and 30 demonstrate blending of a polyurethane emulsion of the present invention with an acrylic copolymer emulsion and a nitrile copolymer emulsion respectively to produce stable colloidal mixtures that can be used to produce hybrid coatings having the excellent breathability of compositions of the present invention.

Examples 31 and 32 demonstrate production of dispersions useful in making breathable personal care coatings as delivery vehicles for moisturizers, healing and nurturing ingredients, and the like.

Examples 33 and 34 demonstrate production of dispersions (from aromatic polyols) that are useful in making highly breathable compositions.

Example 1

Prepolymer Step

The following materials were charged to a reactor: 364 grams PTHF 1000 and 60 grams Tegomer D-3403. Then with mixing, 177 grams IPDI were charged. The reactor was heated to 210–220° F. and after 30 minutes, two drops of FASCAT® 2003 catalyst were added. The mixture was stirred for 3 hours under a nitrogen blanket. The remaining isocyanate (NCO) was found to be 5.2% by titration with DBA and 1.0M HCl. The mixture was cooled to 170° F. for transfer of the prepolymer to another reactor.

Extension Step

Prepolymer (500 grams) was charged over the course of about 10 minutes with mixing into a reactor containing 750 grams water at 65° F. The mixture was stirred for 20 minutes to form a dispersion, and 16 grams of hydrazine solution were added over approximately 10 minutes.

Dispersion properties: total solids=40.2 wt. %, pH=5.4, Brookfield viscosity=20 cP, particle size=205 nm.

Example 2

Prepolymer Step

The following materials were charged to a reactor: 335 grams PTHF 1000 and 90 grams Tegomer D-3403. Then with mixing, 175 grams IPDI were charged. The reactor was heated to 210–220° F. and after 40 minutes, two drops of FASCAT® 2003 catalyst was added. The mixture was stirred for 3 hours under a nitrogen blanket. The remaining NCO was found to be 4.8% by titration with DBA and 1.0M HCl. The reactor was cooled to 165° F. for transfer of the prepolymer to another reactor.

Extension Step

Prepolymer (500 grams) was charged over the course of about 10 minutes with mixing into a reactor containing 750 grams water at 65° F. The mixture was stirred for 20 minutes to form a dispersion, and 13 grams of hydrazine solution were added over approximately 10 minutes.

Dispersion properties: total solids=40.6 wt. %, pH=5.5, Brookfield viscosity=25 cP, particle size=140 nm.

Example 3

Prepolymer Step

The following materials were charged to a reactor: 307 grams PTHF 1000 and 120 grams Tegomer D-3403. Then with mixing, 173 grams IPDI were charged. The reactor was heated to 210–220° F., and after 40 minutes, two drops of FASCAT® 2003 catalyst were added. The mixture was stirred for 3 hours under a nitrogen blanket. The remaining NCO was found to be 4.6% by titration with DBA and 1.0M HCl. The reactor was cooled to 165° F. for transfer of the prepolymer to another reactor.

Extension Step

Prepolymer (500 grams) was charged over the course of about 10 minutes with mixing into a reactor containing 750 grams water at 65° F. The mixture was stirred for 20 minutes to form a dispersion, and 17 grams of hydrazine solution were added over approximately 10 minutes.

Dispersion properties: total solids=40.8 wt. %, pH=5.5, Brookfield viscosity=50 cP, particle size=112 nm.

Example 4

Prepolymer Step

The following materials were charged to a reactor: 320 grams PTHF 2000 and 154 grams Tegomer D-3403. Then with mixing, 121 grams IPDI were charged. The reactor was heated to 210–220° F. and after 40 minutes, two drops of FASCAT® 2003 catalyst were added. The mixture was stirred for 4 hours under a nitrogen blanket. The remaining NCO was found to be 3.1% by titration with DBA and 1.0M HCl. The reactor was ooled to 145° F. for transfer of the prepolymer to another reactor.

Extension Step

Prepolymer (500 grams) was charged over the course of about 10 minutes with mixing into a reactor containing 930 grams water at 70° F. The mixture was stirred for 20 minutes to form a dispersion, and 11.5 grams of hydrazine solution were added over approximately 10 minutes.

Dispersion properties: total solids=34.1 wt. %, pH=5.1, Brookfield viscosity=22 cP, particle size=86 nm.

Example 5

Prepolymer Step

The following materials were charged to a reactor: 222 grams PTHF 1000 and 210 grams Tegomer D-3403. Then with mixing, 168 grams IPDI were charged. The reactor was heated to 210–220° F. and after 30 minutes, two drops of FASCATO 2003 catalyst were added. The mixture was stirred for 3 hours under a nitrogen blanket. The remaining NCO was found to be 4.3% by titration with DBA and 1.0M HCL. The reactor was cooled to 150° F. for transfer of the prepolymer to another reactor.

Extension Step

Prepolymer (500 grams) was charged over the course of about 10 minutes with mixing into a reactor containing 815 grams water at 65° F. The mixture was stirred for 30 minutes to form a dispersion, and 15 grams of hydrazine solution were added over approximately 10 minutes.

Dispersion properties: total solids=38.5 wt. %, pH=5.8, Brookfield viscosity=620 cP, particle size=136 nm.

Example 6

Prepolymer Step

The following materials were charged to a reactor: 166 grams PTHF 1000 and 270 grams Tegomer D-3403. Then with mixing, 164 grams IPDI were charged. The reactor was heated to 210–220° F. and after 30 minutes, two drops of FASCAT® 2003 catalyst were added. The mixture was stirred for 3 hours under a nitrogen blanket. The remaining NCO was found to be 4.0% by titration with DBA and 1.0M HCl. The reactor was cooled to 150° F. for transfer of the prepolymer to another reactor.

Extension Step

Prepolymer (500 grams) was charged over the course of about 10 minutes with mixing into a reactor containing 930 grams water at 65° F. The mixture was stirred for 30 minutes and to form a dispersion, and 15 grams of hydrazine solution were added over approximately 10 minutes.

Dispersion properties: total solids=35 wt. %, pH=6.2, Brookfield viscosity=840 cP, particle size=56 nm.

Example 7

Prepolymer Step

The following materials were charged to a reactor: 350.9 grams PTHF-1000, and 193.6 grams Tegomer D-3403. Then with mixing, 255.5 grams Desmodur W was added. The batch was warmed to 200° F., then 2 drops of FASCAT® 2003 were added. The batch was held at 200–267° F. for about 2½ hour. The isocyanate content was measured at 4.17% by titration with DBA and 1.0M HCl. The reactor was cooled to 160° F. for transfer of the prepolymer to another reactor.

Extension Step

Prepolymer (750 grams) was charged to 1222 grams of water at 77° F. After about 1 hour of stirring, 26.43 grams of hydrazine solution was slowly charged. The resultant dispersion had a theoretical solids content of 38 wt. %.

Example 8

Prepolymer Step

The following materials were charged to a reactor: 216 grams PTHF 1000 and 192 grams Tegomer D-3403. Then with mixing, 192 grams Desmodur W were charged. The reactor was heated to 210–220° F. and after 40 minutes, two drops of FASCAT® 2003 catalyst were added. The mixture was stirred for 3 hours under a nitrogen blanket. The remaining NCO was found to be 4.7% by titration with DBA and 1.0M HCl. The reactor was cooled to 170° F. for transfer of the prepolymer to another reactor.

Extension Step

Prepolymer (450 grams) was charged over the course of about 10 minutes with mixing into a reactor containing 876 grams water and 0.5 grams DeeFo 97–3 defoamer at 70° F. The mixture was stirred for 1.5 hours to form a dispersion, and 17 grams of hydrazine solution was added over approximately 10 minutes.

Dispersion properties: total solids=34.6 wt. %, pH=5.6, Brookfield viscosity=130 cP, particle size=71 nm.

Example 9

Prepolymer Step

The following materials were charged to a reactor: 171 grams PTHF 1000 and 240 grams Tegomer D-3403. Then with mixing, 189 grams Desmodur W were charged. The reactor was heated to 210–220° F. and after 40 minutes, two drops of FASCAT® 2003 catalyst were added. The mixture was stirred for 3 hours under a nitrogen blanket. The remaining NCO was found to be 4.1% by titration with DBA and 1.0M HCl. The reactor was cooled to 200° F. for transfer of the prepolymer to another reactor.

Extension Step

Prepolymer (450 grams) was charged over the course of about 5 minutes with mixing into a reactor containing 957 grams water and 0.5 grams DeeFo 97-3 defoamer at 88° F. The mixture was stirred for 2 hours to form a dispersion, and 14 grams of hydrazine solution was added over approximately 10 minutes.

Dispersion properties: total solids=32.2 wt. %, pH=5.8, Brookfield viscosity=150 cP, particle size=84 nm.

Example 10

Prepolymer Step

The following materials were charged to a reactor: 102 grams PTHF 650, 17 grams PTHF 250, and 258 grams Tegomer D-3403. Then with mixing, 222 grams Desmodur W were charged. The reactor was heated to 210–220° F. and after 30 minutes, two drops of FASCAT® 2003 catalyst were added. The mixture was stirred for 2 hours under a nitrogen blanket. The remaining NCO was found to be 5.0% by titration with DBA and 1.0M HCl. The reactor was cooled to 200° F. for transfer of the prepolymer to another reactor.

Extension Step

Prepolymer (500 grams) was charged over the course of about 10 minutes with mixing into a reactor containing 971 grams water and 0.5 grams DeeFo 97-3 defoamer at 90° F. The mixture was stirred for 1.5 hours to form a dispersion, and 19 grams of hydrazine solution was added over approximately 10 minutes.

Dispersion properties: total solids=34.0 wt. %, pH=5.5, Brookfield viscosity=900 cP, particle size=30 nm.

Example 11

Prepolymer Step

The following materials were charged to a reactor: 280 grams PPG 1025 and 151 grams Tegomer D-3403. Then with mixing, 169 grams IPDI were charged. The reactor was heated to 210–220° F. and after 1.5 hours, two drops of FASCAT® 2003 catalyst were added. The mixture was stirred for 3 hours under a nitrogen blanket. The remaining NCO was found to be 4.7% by titration with DBA and 1.0M HCl. The reactor was cooled to 140° F. for transfer of the prepolymer to another reactor.

Extension Step

Prepolymer (500 grams) was charged over the course of about 10 minutes with mixing into a reactor containing 931 grams water and 0.5 grams DeeFo 97-3 defoamer at 70° F. The mixture was stirred for 1 hour to form a dispersion, and 15 grams of hydrazine solution was added over approximately 10 minutes.

Dispersion properties: total solids=35.7 wt. %, pH=5.1, Brookfield viscosity=40 cP, particle size=84 nm.

Example 12

Prepolymer Step

The following materials were charged to a reactor: 327 grams Polyol PPG 2025 and 154 grams Tegomer D-3403. Then with mixing, 121 grams IPDI were charged. The reactor was heated to 210–220° F. and the mixture stirred for 4 hours under a nitrogen blanket. The remaining NCO was found to be 2.15% using a titration with dibutylamine and 1.0M HCl. The reactor was cooled to 140° F. for transfer of the prepolymer to another reactor.

Extension Step

Prepolymer (500 grams) was charged over the course of about 15 minutes with mixing into a reactor containing 931 grams water and 1.4 grams DeeFo XHD-47J defoamer at 65° F. The mixture was stirred for 30 minutes form a dispersion, and 12 grams of hydrazine solution were added over approximately 10 minutes.

Dispersion properties: total solids=35 wt. %, pH=5.7, Brookfield viscosity=34 cP, particle size=76 nm.

Example 13

Prepolymer Step

The following materials were charged to a reactor: 249 grams 67-3000 HNA, 78 grams 67-1000 HNA, and 154 grams Tegomer D-3403. Then with mixing, 121 grams IPDI were charged. The reactor was heated to 210–220° F. and after 30 minutes, two drops of FASCAT® 2003 catalyst were added. The mixture was stirred for 3.5 hours under a nitrogen blanket. The remaining NCO was found to be 3.4% by titration with DBA and 1.0M HCl. The reactor was cooled to 140° F. for transfer of the prepolymer to another reactor.

Extension Step

Prepolymer (500 grams) was charged over the course of about 10 minutes with mixing into a reactor containing 931 grams water at 74° F. The mixture was stirred for 1 hour to form a dispersion, and 12 grams of hydrazine solution was added over approximately 10 minutes.

Dispersion properties: total solids=35.0 wt. %, pH=5.3, Brookfield viscosity=22 cP, particle size=80 nm.

Example 14

Prepolymer Step

The following materials were charged to a reactor: 121 grams Rucoflex S-102–210 and 258 grams Tegomer D-3403. Then with mixing, 221 grams Desmodur W were charged. The reactor was heated to 210–220° F. and after 30 minutes, two drops of FASCAT® 2003 catalyst were added. The mixture was stirred for 3.5 hours under a nitrogen blanket. The remaining NCO was found to be 5.3% by titration with DBA and 1.0M HCl. The reactor was cooled to 190° F. for transfer of the prepolymer to another reactor.

Extention Step

Prepolymer (500 grams) was charged over the course of about 10 minutes with mixing into a reactor containing 1020 grams water and 0.5 grams DeeFo XHJ defoamer at 80° F. The mixture was stirred for 2 hours to form a dispersion, and 17 grams of hydrazine solution was added over approximately 10 minutes.

Dispersion properties: total solids=31.7 wt. %, pH=6.9, Brookfield viscosity=300 cP, particle size=24 nm.

TABLE 1

| Example No. | Wt. % Poly(ethylene oxide) Side Chains in Polyurethane | Upright MVTR, gms/m²/24 hr |
|---|---|---|
| 1 | 8.5 | 465 |
| 2 | 12.8 | 518 |
| 3 | 17.1 | 629 |
| 4 | 22.0 | 646 |
| 5 | 29.9 | 814 |
| 6 | 38.4 | 1010 |
| 7 | 20.6 | 637 |
| 8 | 27.3 | 795 |
| 9 | 34.1 | 950 |
| 10 | 36.7 | 920 |
| 11 | 21.5 | 582 |
| 12 | 21.8 | 697 |
| 13 | 21.8 | 639 |
| 14 | 36.7 | 1000 |

Example 15

Prepolymer Step

The following materials were charged to a reactor: 380 grams Poly G-2177, and 233 grams PPG-2025. Then with mixing, 180 grams IPDI were charged. The reactor was heated to 202° F., and 1 drop of FASCAT® 2003 catalyst was added. After about 1½ hours at 202–234° F., 6.2 grams DMPA was added. After an additional ½ hour at 209–223° F., another drop of catalyst was added. After about 2 more hours, the remaining isocyanate was measured at 4.26% by titration with DBA and 1.0M HCl. After about 2 more hours at 205–220° F., the remaining isocyanate was measured at 3.88% by titration with DBA and 1.0M HCl. A nitrogen blanket was used throughout the reaction cycle. The reactor was cooled to 143° F. for transfer of the prepolymer to another reactor.

Extension Step

Prepolymer. (329 grams) was charged slowly with mixing into a reactor containing 702 grams of water at 58° F. Defoamer (0.16 grams of DF-58) was added to the dispersion. Hydrazine solution (8.03 grams) and water (639 grams) were added to the dispersion to create a total solids content of about 20 wt. %. The final viscosity was estimated to be about 5,000–10,000 cps. The polyurethane was calculated to have about 47 wt. % poly(ethylene oxide) in the main polymer chain.

The dispersion was prepared and testing for MVTR was begun using the method described heretofore. However, delamination of the polyurethane test sample from the fabric occurred during the MVTR test. This occurrence demonstrated the detrimental effect of excessive poly(ethylene oxide) in the main polyurethane chain.

Example 16

Prepolymer Step

The following materials were charged to a reactor: 209.6 grams PPG-2025, 92.4 grams PPG-1025, and 224.8 grams Poly G-2177. Then with mixing, 168.0 grams of IPDI were added. The reactor was heated to 200° F., and 1 drop of FASCAT® 2003 catalyst was added. After about 45 minutes at 198–209° F., 5.2 grams of DMPA and 1 drop of FASCAT® 2003 were added. After 2½ hours at 190–205° F., the remaining isocyanate was measured at 4.6% by titration with DBA and 1.0M HCl. After an additional 80 minutes at 188–218° F., the remaining isocyanate was measured at 4.17 wt. % by titration with DBA and 1.0M HCl. The reactor was cooled to 133° F. for transfer of the prepolymer to another reactor.

Extension Step

Prepolymer was charged with mixing into 929 grams of water containing 1.4 grams DF-58 at 64° F. The process was halted after 94 grams of prepolymer was charged because a poor dispersion was formed. The remaining prepolymer was neutralized with 1 equivalent of TEA, and charged into water while stirring. Water was added to create a theoretical solids content of 26.8 wt. %, and mixed for 15 minutes. Water and hydrazine solution were added alternately until a small amount of isocyanate remained, and the theoretical solids of the dispersion was 15 wt. %. The "dispersion" separated into two layers: a foam top layer, and a clear liquid bottom layer. The excessive viscosity demonstrated the detrimental effect of excessive poly(ethylene oxide) in the main polyurethane chain.

Example 17

Prepolymer Step

The following materials were charged to a reactor: 382.0 grams Poly G-2177, 179.6 grams PTHF-2000, and 46.5 grams KF-6001. Then with mixing, 185.7 grams IPDI were added. The batch was warmed to 184° F., and 2 drops FASCAT® 2003 were added. After about 1½ hours at 188–248° F., 6.3 grams of DMPA were added. After 1½ additional hours at 210–218° F., the remaining isocyanate was measured at 4.00% by titration with DBA and 1.0MHCl. The reactor was cooled to 166° F. for transfer of the prepolymer to another reactor.

Extension Step

Prepolymer (300 grams) was charged with mixing to 449 grams of water at 63° F. over about 10 minutes. About 0.6 grams of DeeFo XHD-47J defoamer was charged to the water. About 6.4 grams hydrazine solution was charged to the batch, and water was added to achieve a theoretical total solids content of about 25 wt. %. The actual viscosity was measured at 36,500 cps, at a solids content of 24.7%. To reduce the viscosity below 10,000 cps, the dispersion had to be diluted to about 21% solids content with water. This occurrence demonstrated the detrimental effect of excessive poly(ethylene oxide) in the main-chain polyurethane chain.

Example 18

Prepolymer Step

The following materials were charged to a reactor: 67 grams PTHF 1000 and 300 grams Tegomer D-3403. Then with mixing, 133 grams IPDI were charged. The reactor was heated to 210–220° F. and after 30 minutes, two drops of FASCAT® 2003 catalyst were added. The mixture was stirred for 3 hours under the blanket of nitrogen. The remaining NCO was found to be 3.7% by titration with DBA and 1.0M HCl. The reactor was cooled to 150° F. for transfer of the prepolymer to another reactor.

Extension Step

Prepolymer (400 grams) was charged over the course of about 10 minutes with mixing into a reactor containing 915 grams water at 65° F. The mixture was stirred for 30 minutes to form a dispersion, and 10 grams of hydrazine solution were added over approximately 10 minutes.

Dispersion properties: total solids=29 wt. %, pH=6.4, Brookfield viscosity=100 cP, particle size=165 nm.

MVTR Testing of Polyurethane

The chain-extended polyurethane was prepared for MVTR testing and tested as described heretofore. It had a poly(ethylene oxide) side-chain content of 60 wt. % and an upright MVTR of 850 grams/m²/24 hr.

Example 19

Prepolymer Step

The following materials were charged to a reactor: 22 grams KF-6001 and 277 grams Tegomer D-3403. Then with mixing, 101 grams IPDI were charged. The reactor was heated to 210–220° F. and after 10 minutes, two drops of FASCAT® 2003 catalyst were added. The mixture was stirred for 3 hours under a nitrogen blanket. The remaining NCO was found to be 3.7% by titration with DBA and 1.0M HCl. The reactor was cooled to 140° F. for transfer of the prepolymer to another reactor.

Extension Step

Prepolymer (300 grams) was charged over the course of about 10 minutes with mixing into a reactor containing 1205 grams water at 65° F. The mixture was stirred for 20 minutes to form a dispersion, and 7 grams of hydrazine solution were added over approximately 10 minutes.

Dispersion properties: total solids=20.2 wt. %, pH=6.5, Brookfield viscosity=20 cP.

MVTR Testing of Polyurethane

The chain-extended polyurethane was prepared for MVTR testing and tested as described heretofore. It had a poly(ethylene oxide) side-chain content of 70 wt. % and an upright MVTR of 750 grams/m$^2$/24 hr.

Example 20

Prepolymer Step

The following materials were charged to a reactor: 322 grams PTHF 1000, 27 grams KF-6001 and 195 grams Tegomer D-3403. Then with mixing, 256 grams Desmodur W were charged. The reactor was heated to 210–220° F. and after 15 minutes, two drops of FASCAT® 2003 catalyst were added. The mixture was stirred for 1.5 hours under a nitrogen blanket. The remaining NCO was found to be 4.8% by titration with DBA and 1.0M HCl. The reactor was cooled to 160° F. for transfer of the prepolymer to another reactor.

Extension Step

Prepolymer (770 grams) was charged over the course of about 15 minutes with mixing into a reactor containing 1180 grams water at 70° F. The mixture was stirred for 1 hour 20 minutes to form a dispersion, and 33 grams of hydrazine solution were added over approximately 10 minutes.

Dispersion properties: total solids=40 wt. %, pH=5.9, Brookfield viscosity=225 cP.

MVTR Testing of Polyurethane

The chain-extended polyurethane was prepared for MVTR testing and tested as described heretofore. It had a reactive silicone compound polymerized into the backbone, poly(ethylene oxide) side-chain content of 25.4 wt. %, and an upright MVTR of 640 grams/m$^2$/24 hr.

Example 21

Prepolymer Step

The following materials were charged to a reactor: 147 grams PTHF-2000, 215 grams PTHF-1000, 34.4 grams KF-6001, and 202.8 grams Tegomer D-3403. Then with mixing, 201 grams of IPDI were added. The batch was warmed to 200° F., and 2 drops of FASCAT® 2003 were charged. After 1¾ hours at 200–247° F., the remaining isocyanate was measured at 4.3% by titration with DBA and 1.0M HCl. The prepolymer was cooled to 150° F. for transfer to another reactor.

Extension Step

Prepolymer (785 grams) was charged to 1060 grams of water at 73° F. After about 45 minutes of stirring, 23.4 grams of hydrazine solution was charged. The final total solids content was about 43 wt. %.

MVTR Testing of Polyurethane

The chain-extended polyurethane was prepared for MVTR testing and tested as described heretofore. It had a reactive silicone compound polymerized into the backbone, poly(ethylene oxide) side-chain content of 21.5 wt. %, and an upright MVTR of 740 grams/m$^2$/24 hr.

Example 22

Prepolymer Step

The following materials were charged to a reactor: 335 grams PTHF-1000, 28.2 grams KF-6001, and 202.4 grams Tegomer D-3403. Then with mixing, 173.2 grams IPDI and 61.3 grams Desmodur W were added. The reactor was warmed to 180° F., and 2 drops of FASCAT® 2003 were charged. The batch was held at 191–257° F. for about 3 hours. The remaining isocyanate was measured at 5.0% by titration with DBA and 1.0M HCl. The prepolymer was cooled to 135° F. for transfer to another reactor.

Extension Step

Prepolymer (770 grams) was charged to 1140 grams of water at 76° F. After about 50 minutes of stirring, 32.2 grams of hydrazine solution were charged. The theoretical solids content of the dispersion was 40.4 wt. %.

MVTR Testing of Polyurethane

The chain-extended polyurethane was prepared for MVTR testing and tested as described heretofore. It had a reactive silicone compound polymerized into the backbone, poly(ethylene oxide) side-chain content of 21.5 wt. %, and an upright MVTR of 680 grams/m$^2$/24 hr.

Example 23

Prepolymer

The following materials were charged to a reactor: 294.2 grams PPG-1025, 176.6 grams Tegomer D-3403, and 2.23 grams TMP. Then with mixing, 250.5 grams of Desmodur W was added. Next 57.5 grams of Poly G 1450 were added. The batch was warmed to 186° F. and 2 drops of FASCAT® 2003 were charged. The batch was held at 190–228° F. for about 4½ hours. The remaining isocyanate was measured at 4.8% by titration with DBA and 1.0M HCl. The reactor was cooled to 160° F. for transfer of the prepolymer to another reactor.

Extension Step

Prepolymer (720 grams) was charged to 1317 grams of water at 73° F., and stirred until a smooth appearance was obtained. Water and hydrazine solution were alternately charged to a total of 522 grams water and 28.2 grams hydrazine solution. After the dispersion had aged 3 days, 434 additional grams of water were added. Dispersion properties: total solids=23.63 wt. %, Brookfield viscosity= 185 cps, pH=6.4.

MVTR Testing of Polyurethane

The chain-extended polyurethane was prepared for MVTR testing and tested as described heretofore. It had a poly(ethylene oxide) side-chain content of 19.2 wt. %, a poly(ethylene oxide) main chain content of 7.4 wt. %, and an upright MVTR of 870 grams/m$^2$/24 hr.

Example 24

Prepolymer Step

The following materials were charged to a reactor: 89.1 grams PTHF-1000, 187.7 grams PPG-1025, 50.4 grams Poly G 1450, 182.7 grams Tegomer D-3403, and 3.6 grams of TMP. Then with mixing, 259.7 grams of Desmodur W were added. The batch was allowed to react about 1 hour at 196–201° F., and 2 drops of FASCAT® 2003 were added. The batch was then allowed to react for about 2½ hours at 195–235° F. The remaining isocyanate was measured at 4.8% by titration with DBA and 1.0M HCl. The prepolymer was cooled to 137° F. for transfer to another reactor.

Extension Step

Prepolymer (650 grams) was charged to 1207 grams of water at 72° F., which contained 1.0 gram of DeeFo 97–3 defoamer. After about ½ hour mixing, 176 grams of water was added to the dispersion. After 1 hour of additional mixing, 16.8 grams of hydrazine solution were added. Then, additional water and hydrazine solution were alternately added to totals of 446 grams more water and 8 grams more hydrazine solution. The final theoretical solids content of the dispersion was 26 wt. %.

MVTR Testing of Polyurethane

The chain-extended polyurethane was prepared for MVTR testing and tested as described heretofore. It had a poly(ethylene oxide) side-chain content of 20.1 wt. %, a poly(ethylene oxide) main chain content of 6.5 wt. %, and an upright MVTR of 830 grams/m$^2$/24 hr.

Example 25

Prepolymer Step

The following materials were charged to a reactor: 216 grams PTHF 1000, 21.5 grams DMPA and 150 grams Tegomer D-3403. Then with mixing, 212 grams IPDI were charged. The reactor was heated to 210–220° F. and after 30 minutes, two drops of FASCAT® 2003 catalyst were added. The mixture was stirred for 3.5 hours under a nitrogen blanket. The remaining NCO was found to be 5.5% by titration with DBA and 1.0M HCl. The prepolymer was cooled to 140° F. for transfer to another reactor.

Extension Step

Prepolymer (500 grams) was charged over the course of about 10 minutes with mixing into a reactor containing 850 grams water and 0.5 grams DeeFo 97–3 defoamer at 70° F. The mixture was stirred for 25 minutes to form a dispersion, and 19 grams of hydrazine solution were added over approximately 10 minutes.

Dispersion properties: total solids=37.3 wt. %, pH=5.5, Brookfield viscosity=480 cP, particle size=155 nm.

MVTR Testing of Polyurethane

The chain-extended polyurethane was prepared for MVTR testing and tested as described heretofore. It had a poly(ethylene oxide) side-chain content of 21.3 wt. %, incorporated a compound having a crosslinkable carboxyl functional group (DMPA) into the backbone, and had an upright MVTR of 570 grams/m$^2$/24 hr.

Example 26

Synthesis of Monomer having Side-Chain Poly(ethylene oxide)

To a reactor containing 67 grams TDI, 190 grams MPEG 550 were added with stirring at 80 to 86° F. for about one hour under a nitrogen blanket. The reaction mixture was stirred at 95 to 120° F. for 2 hours after which the remaining isocyanate content was measured at 6.5% by titration with DBA and 1.0M HCl. The reactor was cooled to 90° F., and 43 grams diethanolamine were added over 3 minutes. The temperature rose to 176° F. as a result of the highly exothermic reaction. The reactor was cooled, and the contents were stirred at 140 to 150° F. for 2.5 hours. At the end of this period, there was no unreacted isocyanate left as evidenced by IR analysis of the sample. After transferring the reactor contents into a plastic storage container, the reaction product solidified while cooling to room temperature.

The hydroxyl number on the monomer having side-chain poly(ethylene oxide) was measured at about 250.

Prepolymer Step

The following materials were charged to a reactor under a nitrogen blanket: 203 grams of the above-described monomer, 115 grams PTHF 1000 and 282 grams Desmodur W. Then with mixing, the reactor was heated to 210–220° F., and two drops of FASCAT® 2003 catalyst were added after 1¼ hours. The mixture was stirred for 3 hours. The remaining isocyanate content was found to be 9.7% by titration with DBA and 1.0M HCl. The reactor was cooled to 200° F. for transfer of the prepolymer to another reactor.

Extension Step

Prepolymer (500 grams) was charged over the course of about 5 minutes with mixing into a reactor containing 970 grams water and 1.4 grams DeeFo XHD-47J at 70° F. The mixture was stirred for 1 hour 10 minutes to form a dispersion, and 32 grams of hydrazine solution were added over approximately 10 minutes.

Dispersion properties: total solids=33.9 wt. %, pH=9.4, Brookfield viscosity=11 cP, particle size=42 nm.

MVTR Testing of Polyurethane

The polyurethane was prepared and tested for MVTR as described heretofore. It had an inferior upright MVTR of 450 grams/m$^2$/24 hr.

Example 27

Synthesis of Monomer having Side-Chain Poly(ethylene oxide)

To a reactor containing 260 grams MPEG 2000 at 120° F., 24 grams TDI were added under a nitrogen blanket, and the mixture was stirred at 120 to 140° F. for 4 hours. The remaining isocyanate content was measured at 1.7% by titration with DBA and 1.0M HCl. At 140° F., 16 grams diethanolamine were added. The temperature rose to 170° F. as a result of the exothermic reaction. The reactor was cooled and the contents were stirred at 140 to 150° F. for 4 hours. At the end of this period, there was no unreacted NCO left as evidenced by IR analysis of the sample. After transferring the reactor contents into a plastic storage container, the reaction product solidified while cooling to room temperature.

The hydroxyl number of the monomer having side-chain poly(ethylene oxide) was measured at about 103.

Prepolymer Step

The following materials were charged to a reactor under a nitrogen blanket: 164 grams of the above-described monomer, 240 grams PTHF 1000 and 196 grams Desmodur W. Then with mixing, the reactor was heated to 210–220° F., and after 30 minutes, two drops of FASCAT® 2003 catalyst were added. The mixture was stirred for 5 hours. The remaining isocyanate content was found to be 5.4% by titration with DBA and 1.0M HCl. The reactor was cooled to 200° F. for transfer of the prepolymer to another reactor.

Extension Step

Prepolymer (500 grams) was charged over the course of about 10 minutes with mixing into a reactor containing 970 grams water at 70° F. The mixture was stirred for 45 minutes to form a dispersion, and 18 grams of hydrazine solution were added over approximately 10 minutes.

Dispersion properties: total solids=34.1% wt., pH=8.5, Brookfield viscosity=400 cP, particle size=320 nm.

MVTR Testing of Polyurethane

The polyurethane was prepared and tested for MVTR as described heretofore. It had poly(ethylene oxide) side-chain content of 25 wt. % and an upright MVTR of 735 grams/m$^2$/24 hr.

Example 28

The chain-extended polyurethane dispersion of Example 14 was blended with Hycar® 2671 acrylic polymer emulsion (available from Noveon, Inc.) at a 60/40 ratio (based on solids content) to produce a stable colloidal mixture. The mixture was prepared and tested for MVTR as described heretofore. It had had an MVTR of 720 grams/m²/24 hours, compared to an MVTR of 160 grams/m²/24 hours for Hycar® 2671 alone prepared and tested in the same way as described heretofore.

Example 29

The chain-extended polyurethane dispersion of Example 14 was blended with the acrylic copolymer emulsion of step (1) of Example 20 of WIPO Publication WO 02/02657 A2 at a 60/40 ratio (based on solids content) to produce a stable colloidal mixture. The mixture was prepared for testing and tested for MVTR as described heretofore. It had an MVTR of 800 grams/m²/24 hours, compared to an MVTR of 440 grams/m²/24 hours for the acrylic polymer emulsion of Example 20 alone that was prepared for testing and tested for MVTR as described heretofore.

Example 30

The chain-extended polyurethane dispersion of Example 14 was blended with the nitrile copolymer emulsion of step (1) of Example 13 of WIPO Publication WO 02/02657 A2 at a 60/40 ratio (based on solids content) to produce a stable colloidal mixture. The mixture was prepared for testing and tested for MVTR as described heretofore. It had an an MVTR of 790 grams/m²/24 hours, compared to an MVTR of 480 grams/m²/24 hours for the nitrile polymer emulsion of step (1) of Example 13 alone that was prepared for testing and tested as described heretofore.

Example 31

Prepolymer Step

The following materials were charged to a reactor: 87 grams X-22–160AS, 10 grams TMP and 222 grams Tegomer D-3403. Then with mixing, 191 grams Desmodur W were charged. The reactor was heated to 225–235° F. The mixture was stirred for 3 hours under a nitrogen blanket. The remaining isocyanate (NCO) was found to be 5.6% by titration with DBA and 1.0M HCl. Then 90 grams Dow 345 were added to the mixture and the temperature reduced to 200° F. After mixing for 30 minutes, the prepolymer was transferred to another reactor for dispersing.

Extension Step

Prepolymer (500 grams) was charged over the course of about 10 minutes with mixing into a reactor containing 820 grams water at 70° F. The mixture was stirred for 30 minutes to form dispersion, and 21 grams of 25% ethylenediamine solution in water was added over approximately 10 minutes.

Dispersion properties: Total solids=31.3 wt. %, pH=6.9, Brookfield viscosity=270 cP, particle size=450 nm.

Example 32

Prepolymer Step

The following materials were charged to a reactor: 196 grams PPG 2025 and 168 grams Tegomer D-3403. Then with mixing, 116 grams Desmodur W were charged. The reactor was heated to 210–220° F. and after 40 minutes two drops of FASCAT® 2003 catalyst were added. The mixture was stirred for 3 hours under a nitrogen blanket. The remaining NCO was found to be 2.3% by titration with DBA and 1.0M HCl. Sunflower oil (120 grams) was added and the reactor was cooled to 180° F. After mixing for 30 minutes, the prepolymer was transferred to another reactor for dispersing.

Extension Step

Prepolymer (450 grams) was charged over the course of about 10 minutes with mixing into a reactor containing 670 grams water at 70° F. The mixture was stirred for 20 minutes to form a dispersion, and 5 grams of hydrazine solution were added over approximately 10 minutes.

Dispersion properties: Total solids=42 wt. %, pH 6.2, Brookfield viscosity=800 cP, particle size=274 nm.

Example 33

Prepolymer Step

The following materials were charged to a reactor: 118 grams 70–500 HAI and 258 grams Tegomer D-3403. Then with mixing, 224 grams Desmodur W were charged. The reactor was heated to 210–220° F. and after 15 minutes, two drops of FASCAT® 2003 catalyst were added. The mixture was stirred for 4 hours under a nitrogen blanket. The remaining isocyanate (NCO) was found to be 4.8% by titration with DBA and 1.0M HCl. The mixture was cooled to 200° F. for transfer of the prepolymer to another reactor.

Extension Step

Prepolymer (500 grams) was charged over the course of about 10 minutes with mixing into a reactor containing 1120 grams water and 0.5 grams DeeFo XHD-47J at 80° F. The mixture was stirred for 2 hours to form a dispersion, and 16 grams of hydrazine solution were added over approximately 10 minutes.

Dispersion properties: total solids=31.8 wt. %, pH=6.4, Brookfield viscosity=300 cP, particle size=25 nm.

MVTR Testing of Polyurethane

The chain-extended polyurethane was prepared for MVTR testing and tested as described heretofore. It had poly(ethylene oxide) side-chain content of 36.7 wt. %, and an upright MVTR of 830 grams/m²/24 hr.

Example 34

Prepolymer Step

The following materials were charged to a reactor: 119 grams 500 DI and 258 grams Tegomer D-3403. Then with mixing, 223 grams Desmodur W were charged. The reactor was heated to 210–220° F. and after 1 hour, two drops of FASCAT® 2003 catalyst were added. The mixture was stirred for 3.5 hours under a nitrogen blanket. The remaining isocyanate (NCO) was found to be 5.3% by titration with DBA and 1.0M HCl. The mixture was cooled to 200° F. for transfer of the prepolymer to another reactor.

Extension Step

Prepolymer (510 grams) was charged over the course of about 10 minutes with mixing into a reactor containing 1110 grams water and 1 gram DeeFo XHD-47J at 75° F. The mixture was stirred for 3 hours to form a dispersion, and 17 grams of hydrazine solution were added over approximately 10 minutes.

Dispersion properties: total solids=31.4 wt. %, pH=7.1, Brookfield viscosity=470 cP, particle size=26 nm.

MVTR Testing of Polyurethane

The chain-extended polyurethane was prepared for MVTR testing and tested as described heretofore. It had poly(ethylene oxide) side-chain content of 36.7 wt. %, and an upright MVTR of 840 grams/m²/24 hr.

While in accordance with the patent statutes the best mode and preferred embodiment has been set forth, the scope of the invention is not limited thereto, but rather by the scope of the attached claims.

What is claimed is:

1. A polyurethane composition having an upright moisture vapor transmission rate (MVTR) of more than about 500 gms/m²/24 hr and comprising:

(a) poly(alkylene oxide) side-chain units in an amount comprising about 29.9 wt. % to about 80 wt. % of said polyurethane, wherein (i) alkylene oxide groups in said poly(alkylene oxide) side-chain units have from 2 to 10 carbon atoms and are unsubstituted, substituted, or both unsubstituted and substituted, (ii) at least about 50 wt. % of said alkylene oxide groups are ethylene oxide, and (iii) said amount of said side-chain units is at least about 30 wt. % when the molecular weight of said side-chain units is less than about 600 grams/mole, and (b) poly(ethylene oxide) main-chain units in an amount comprising less than about 25 wt. % of said polyurethane.

2. A composition of claim 1 wherein said poly(ethylene oxide) main-chain units comprise less than about 15 wt. % of said polyurethane.

3. A composition of claim 2 wherein said poly(ethylene oxide) main-chain units comprise 0 wt. % of said polyurethane.

4. A composition of claim 1 wherein said poly(alkylene oxide) side-chain units comprise poly(ethylene oxide) units.

5. A composition of claim 2 wherein said poly(alkylene oxide) side-chain units comprise poly(ethylene oxide) units.

6. A composition of claim 3 wherein said poly(alkylene oxide) side-chain units comprise poly(ethylene oxide) units.

7. A composition of claim 1 wherein said polyurethane comprises the reaction product of (1) at least one polyisocyanate having an average of about 2 or more isocyanate groups and (2) at least one polyol having an average of two or more hydroxyl groups per molecule.

8. A composition of claim 7 wherein said polyurethane comprises the reaction product of (1) at least one polyisocyanate having an average of about 2 to about 4 isocyanate groups, (2) at least one polyester polyol, polyether polyol, or combinations thereof, and (3) at least one chain extender comprising water, an inorganic or organic polyamine having an average of about 2 or more primary or secondary amine groups or combinations thereof, a polyalcohol, a urea, or combinations thereof.

9. A composition of claim 8 wherein said chain extender comprises a compound selected from diethylene triamine, ethylene diamine, meta-xylylenediamine, aminoethyl ethanolamine, 2-methyl pentane diamine, propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary amines, sulfonated secondary amines, ethylene glycol, diethylene glycol, neopentyl glycol, butanediols, hexanediol, ureas, hydrazine, and mixtures thereof.

10. A composition of claim 8 wherein said polyurethane has reacted therein at least one active hydrogen-containing compound not having said side chains, and said compound has a molecular weight from about 50 to about 10,000 grams/mole.

11. A composition of claim 10 wherein said active hydrogen-containing compound not having said side chains has a molecular weight from about 200 to about 6,000 grams/mole.

12. A composition of claim 11 wherein said active hydrogen-containing compound not having said side chains comprises a polyol or polyamine having a molecular weight from about 300 to about 3,000 grams/mole.

13. A composition of claim 12 wherein said active hydrogen- containing compound not having said side chains comprises polysiloxane polyols, ethoxylated polysiloxane polyols, polytetrahydrofuran, polyethylene glycol, polypropylene glycol, poly(ethylene oxide), poly(butanediol adipate), hexane adipate isophthalate polyester, hexane neopentyl adipate polyester, or combinations thereof.

14. A composition of claim 12 wherein said polyisocyanate comprises a diisocyanate.

15. A composition of claim 14 wherein said diisocyanate comprises m-tetramethyl xylylene diisocyanate, p-tetramethyl xylylene diisocyanate, 1,1'methylenebis-4-(isocyanato cyclohexane), isophorone diisocyanate 4,4'-diphenylmethylene diisocyanate, toluene diisocyanate, or combinations thereof.

16. A composition of claim 1 or 10 wherein said polyurethane also has reacted therein at least one compound having at least one crosslinkable functional group.

17. A composition of claim 16 wherein said crosslinkable functional group comprises carboxylic, carbonyl, amine, hydroxyl, hydrazide, or combinations thereof.

18. A composition of claim 17 wherein said compound having at least one crosslinkable functional group has the formula $(HO)_xQ(COOH)_y$ wherein Q is a straight or branched hydrocarbon radical having 1 to 12 carbon atoms, and x and y are 1 to 3.

19. A composition of claim 18 wherein said compound having at least one crosslinkable functional group comprises at least one dihydroxy-carboxylic acid.

20. A composition of claim 19 wherein said dihydroxy-carboxylic acid comprises dimethylolpropanoic acid.

21. A composition of claim 13 wherein said chain extender comprises a compound selected from diethylene triamine, ethylene diamine, meta-xylylenediamine, aminoethyl ethanolamine, 2-methyl pentane diamine, propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4- diamino diphenylmethane, sulfonated primary amines, sulfonated secondary amines, ethylene glycol, diethyene glycol, neopentyl glycol, butanediols, hexanediol, ureas, hydrazine, and mixtures thereof.

22. A composition of claim 19 wherein said chain extender comprises hydrazine.

23. A composition comprising a blend of the composition of claim 1 with at least one other polymer.

24. A composition of claim 23 wherein said other polymer comprises natural rubber, a conjugated-diene-containing polymer, polychlorobutadiene, a hydrogenated styrene-butadiene triblock copolymer, chlorosulfonated polyethylene, an ethylene copolymer, an acrylic ester copolymer, a methacrylic ester copolymer, vinyl chloride copolymers, vinylidene chloride copolymers, polyisobutylene, a polyurethane, a polyurea, a poly(urethane/urea), or combinations thereof.

25. A composition of claim 24 wherein said other polymer comprises an acrylic ester copolymer, a methacrylic ester copolymer, or combinations thereof.

26. An article comprising a polyurethane having an upright moisture vapor transmission rate (MVTR) of more than about 500 gms/m$^2$/24 hr and comprising:

(a) poly(alkylene oxide) side-chain units in an amount comprising about 29.9 wt. % to about 80 wt. % of said polyurethane, wherein (i) alkylene oxide groups in said poly(alkylene oxide) side-chain units have from 2 to 10 carbon atoms and are unsubstituted, substituted, or both unsubstituted and substituted, (ii) at least about 50 wt. % of said alkylene oxide groups are ethylene oxide, and (iii) said amount of said side-chain units is at least about 30 wt. % when the molecular weight of said side-chain units is less than about 600 grams/mole, and (b) poly(ethylene oxide) main-chain units in an amount comprising less than about 25 wt. % of said polyurethane.

27. An article of claim 26 wherein said poly(ethylene oxide) main-chain units comprise less than about 15 wt. % of said polyurethane.

28. An article of claim 27 wherein said poly(ethylene oxide) main-chain units comprise less than about 0 wt. % of said polyurethane.

29. An article of claim 26 wherein said poly(alkylene oxide) side-chain units comprise poly(ethylene oxide) units.

30. An article of claim 27 wherein said poly(alkylene oxide) side-chain units comprise poly(ethylene oxide) units.

31. An article of claim 28 wherein said poly(alkylene oxide) side-chain units comprise poly(ethylene oxide) units.

32. An article of claim 26 wherein said polyurethane comprises the reaction product of (1) at least one polyisocyanate having an average of about 2 or more isocyanate groups and (2) at least one polyol having an average of two or more hydroxyl groups per molecule.

33. An article of claim 32 wherein said polyurethane comprises the reaction product of (1) at least one polyisocyanate having an average of about 2 to about 4 isocyanate groups, (2) a polyester polyol, a polyether polyol, or combinations thereof, and (3) a chain extender comprising water, an inorganic or organic polyamine having an average of about 2 or more primary or secondary amine groups or combinations thereof, a polyalcohol, a urea, or combinations thereof.

34. An article of claim 33 wherein said chain extender comprises a compound selected from diethylene triamine, ethylene diamine, meta-xylylenediamine, aminoethyl ethanolamine, 2-methyl pentane diamine, propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary amines, sulfonated secondary amines, ethylene glycol, diethylene glycol, neopentyl glycol, butanediols, hexanediol, ureas, hydrazine, and mixtures thereof.

35. An article of claim 33 wherein said polyurethane has reacted therein at least one active hydrogen-containing compound not having said side chains, and said compound has a molecular weight from about 50 to about 10,000 grams/mole.

36. An article of claim 35 wherein said active hydrogen-containing compound not having said side chains comprises a polyol or polyamine having a molecular weight from about 200 to about 6,000 grams/mole.

37. An article of claim 36 wherein said active hydrogen-containing compound not having said side chains has a molecular weight from about 300 to about 3,000 grams/mole.

38. An article of claim 37 wherein said active hydrogen-containing compound not having said side chains comprises polysiloxane polyols, ethoxylated polysiloxane polyols, polytetrahydrofuran, polyethylene glycol, polypropylene glycol, poly(ethylene oxide), poly(butanediol adipate), hexane adipate isophthalate polyester, hexane neopentyl adipate polyester, or combinations thereof.

39. An article of claim 37 wherein said polyisocyanate comprises a diisocyanate.

40. An article of claim 39 wherein said diisocyanate comprises m-tetramethyl xylylene diisocyanate, p-tetramethyl xylylene diisocyanate, 1,1'-methylenebis-4-(isocyanato cyclohexane), isophorone diisocyanate, 4,4'-diphenylmethylene diisocyanate, toluene diisocyanate, or combinations thereof.

41. An article of claim 26 or 35 wherein said polyurethane also has reacted therein at least one compound having at least one crosslinkable functional group.

42. An article of claim 41 wherein said crosslinkable functional group comprises one of carboxylic, carbonyl, amine, hydroxyl, hydrazide, or combinations thereof.

43. An article of claim 42 wherein said compound having at least one crosslinkable functional group has the formula $(HO)_xQ(COOH)_y$ wherein Q is a straight or branched hydrocarbon radical having 1 to 12 carbon atoms, and x and y are 1 to 3.

44. An article of claim 43 wherein said compound having at least one crosslinkable functional group comprises at least one dihydroxy-carboxylic acid.

45. An article of claim 44 wherein said dihydroxy-carboxylic acid comprises dimethylolpropanoic acid.

46. An article of claim 38 or 44 wherein said chain extender comprises a compound selected from diethylene triamine, ethylene diamine, meta-xylylenediamine, aminoethyl ethanolamine, 2-methyl pentane diamine, propylene damine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro- 4,4-diamino diphenylmethane, sulfonated primary amines, sulfonated secondary amines, ethylene glycol, diethylene glycol, neopentyl glycol, butanediols, ureas, hydrazine, and mixtures thereof.

47. An article of claim 44 wherein said chain extender comprises a compound selected from diethylene triamine, ethylene diamine, meta-xylylenediamine, aminoethyl ethanolamine, 2-methyl, pentane diamine, propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary amines, sulfonated secondary amines, ethylene glycol, diethylene glycol, neopentyl glycol, butanediolls, hexanediol, ureas, hydrazine, and mixtures thereof.

48. An article comprising a blend of the polyurethane of claim 26 with at least one other polymer.

49. An article of claim 48 wherein said other polymer comprises natural rubber, a conjugated-diene-containing polymer, polychlorobutadiene, a hydrogenated styrene-butadiene triblock copolymer, chlorosulfonated polyethylene, an ethylene copolymer, an acrylic ester copolymer, a methacrylic ester copolymer, vinyl chloride copolymers, vinylidene chloride copolymers, polyisobutylene, a polyurethane, a polyurea, a poly(urethane/urea), or combinations thereof.

50. An article of claim 49 wherein said other polymer comprises an acrylic ester copolymer, a methacrylic ester copolymer, or combinations thereof.

51. An article of claim 26 comprising a porous or non-porous substrate treated with said polyurethane.

52. An article of claim 51 comprising a porous substrate treated with said polyurethane.

53. An article of claim 52 comprising a textile impregnated, saturated, sprayed or coated with said polyurethane.

54. A personal care composition comprising a topically acceptable phase, together with a polyurethane having an upright moisture vapor transmission rate (MVTR) of more than about 500 gms/m$^2$/24 hr and comprising:

(a) poly(alkylene oxide) side-chain units in an amount comprising about 12 wt. % to about 80 wt. % of said polyurethane, wherein (i) alkylene oxide groups in said poly(alkylene oxide) side-chain units have from 2 to 10 carbon atoms and are unsubstituted, substituted, or both unsubstituted and substituted, (ii) at least about 50 wt. % of said alkylene oxide groups are ethylene oxide, and (iii) said amount of said side-chain units is at least about 30 wt. % when the molecular weight of said side-chain units is less than about 600 grams/mole, at least about 15 wt. % when the molecular weight of said side-chain units is from about 600 to about 1,000 grams/mole, and at least about 12 wt. % when the molecular weight of said side-chain units is more than about 1,000 grams/mole, and (b) poly(ethylene oxide) main-chain units in an amount comprising less than about 25 wt. % of said polyurethane.

55. A personal care composition of claim 54 wherein said poly(alkylene oxide) side-chain units comprise about 15 wt. % to about 60 wt. % of said polyurethane, and said poly(ethylene oxide) main-chain units comprise less than about 15 wt. % of said polyurethane.

56. A personal care composition of claim 55 wherein said poly(alkylene oxide) side-chain units comprise about 20 wt. % to about 50 wt. % of said polyurethane, and said poly(ethylene oxide) main-chain units comprise less than about 5 wt. % of said polyurethane.

57. A personal care composition of claim 54 wherein said poly(alkylene oxide) side-chain units comprise poly(ethylene oxide) units.

58. A personal care composition of claim 55 wherein said poly(alkylene oxide) side-chain units comprise poly(ethylene oxide) units.

59. A personal care composition of claim 56 wherein said poly(alkylene oxide) side-chain units comprise poly(ethylene oxide) units.

60. A personal care composition of claim 54 wherein said polyurethane comprises the reaction product of (1) at least one polyisocyanate having an average of about 2 or more isocyanate groups and (2) at least one polyol having an average of two or more hydroxyl groups per molecule.

61. A personal care composition of claim 60 wherein said polyurethane comprises the reaction product of (1) at least one polyisocyanate having an average of about 2 to about 4 isocyanate groups, (2) a polyester polyol, polyether polyol, polysiloxane polyols, ethoxylated polysiloxane polyols, or combinations thereof, and (3) a chain extender comprising water, an inorganic or organic polyamine having an average of about 2 or more primary or secondary amine groups or combinations thereof, a polyalcohol, a urea, or or combinations thereof.

62. A personal care composition of claim 61 wherein said chain extender comprises a compound selected from diethylene triamine, ethylene diamine, meta-xylylenediamine, aminoethyl ethanolamine, 2-methyl pentane diamine, propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro- 4,4-diamino diphenylmethane, sulfonated primary amines, sulfonated secondary amines, ethylene glycol, diethylene glycol, neopentyl glycol, butanediols, ureas, hydrazine, and mixtures thereof.

63. A personal care composition of claim 61 wherein said polyurethane has reacted therein at least one active hydrogen-containing compound not having said side chains, and said compound has a molecular weight from about 50 to about 10,000 grams/mole.

64. A personal care composition of claim 63 wherein said active hydrogen-containing compound not having said side chains comprises a polyol or polyamine having a molecular weight from about 200 to about 6,000 grams/mole.

65. A personal care composition of claim 64 wherein said active hydrogen-containing compound not having said side chains has a molecular weight from about 300 to about 3,000 grams/mole.

66. A personal care composition of claim 65 wherein said active hydrogen-containing compound not having said side chains comprises polysiloxane polyols, ethoxylated polysiloxane polyols, polytetrahydrofuran, polyethylene glycol, polypropylene glycol, poly(ethylene oxide), poly(butanediol adipate), hexane adipate isophthalate polyester, or combinations thereof.

67. A personal care composition of claim 65 wherein said polyisocyanate comprises a diisocyanate.

68. A personal care composition of claim 67 wherein said diisocyanate comprises m-tetramethyl xylylene diisocyanate, p-tetramethyl xylylene diisocyanate, 1,1'-methylenebis-4-(isocyanato cyclohexane), isophorone diisocyanate, 4,4'-diphenylmethylene diisocyanate, toluene diisocyanate, or combinations thereof.

69. A personal care composition of claim 63 wherein said polyurethane also has reacted therein at least one compound having at least one crosslinkable functional group.

70. A personal care composition of claim 69 wherein said crosslinkable functional group comprises carboxylic, carbonyl, amine, hydroxyl, hydrazide, or combinations thereof.

71. A personal care composition of claim 70 wherein said compound having at least one crosslinkable functional group has the formula $(HO)_xQ(COOH)_y$ wherein Q is a straight or branched hydrocarbon radical having 1 to 12 carbon atoms, and x and y are 1 to 3.

72. A personal care composition of claim 71 wherein said compound having at least one crosslinkable functional group comprises at least one dihydroxy-carboxylic acid.

73. A personal care composition of claim 72 wherein said dihydroxy-carboxylic acid comprises dimethylolpropanoic acid.

74. A personal care composition of claim 66 wherein said chain extender comprises a compound selected from diethylene triamine, ethylene diamine, meta- xylylenediamine, aminoethyl ethanolamine, 2-methyl pentane diamine, propylene diamine, butylene diamine, hexamethylene diamine, cyclohexylene diamine, phenylene diamine, tolylene diamine, 3,3-dichlorobenzidene, 4,4'-methylene-bis (2-chloroaniline), 3,3-dichloro-4,4-diamino diphenylmethane, sulfonated primary amines, sulfonated secondary amines, ethylene glycol, diethylene glycol, neopentyl glycol, butanediols, hexanediol, ureas, hydrazine, and mixtures thereof.

75. A personal care composition of claim 72 wherein said chain extender comprises a compound selected from diethylene triamine, ethylene diamine, meta-xylylenediamine, aminoethyl ethanolamine, 2-methyl pentane diamine, propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary amines, sulfonated secondary amines, ethylene glycol, diethylene glycol, neopentyl glycol, butanediols, hexanediol, ureas, hydrazine, and mixtures thereof.

76. A process for producing a polyurethane, said process comprising:

(A) reacting to form an isocyanate-terminated prepolymer
(1) at least one polyisocyanate having an average of about two or more isocyanate groups, and (2) at least one active hydrogen-containing compound comprising (a) poly(alkylene oxide) side-chain units in an amount comprising about 29.9 wt. % to about 80 wt. % of said polyurethane, wherein (i) alkylene oxide groups in said poly(alkylene oxide) side-chain units have from 2 to 10 carbon atoms and are unsubstituted, substituted, or both unsubstituted and substituted, (ii) at least about 50 wt. % of said alkylene oxide groups are ethylene oxide, and (iii) said amount of said side-chain units is at least about 30 wt. % when the molecular weight of said side-chain units is less than about 600 grams/mole, and (b) poly(ethylene oxide) main-chain units in an amount comprising less than about 25 wt. % of said polyurethane.

(B) dispersing said prepolymer in water, and chain extending said prepolymer by reaction with water, an inorganic or organic polyamine having an average of about 2 or more primary and/or secondary amine groups, a polyalcohols, a urea, or combinations thereof; and (C) thereafter further processing the chain-extended dispersion of step (B) in order to form a composition or article having an upright moisture vapor transmission rate (MVTR) of more than about 500 gms/m$^2$/24 hr.

77. A process of claim 76 wherein said poly(ethylene oxide) main-chain units comprise less than about 15 wt. % of said polyurethane.

78. A process of claim 77 wherein said poly(ethylene oxide) main-chain units comprise 0 wt. % of said polyurethane.

79. A process of claim 76 wherein said poly(alkylene oxide) side-chain units comprise poly(ethylene oxide) units.

80. A process of claim 77 wherein said poly(alkylene oxide) side-chain units comprise poly(ethylene oxide) units.

81. A process of claim 78 wherein said poly(alkylene oxide) side-chain units comprise poly(ethylene oxide) units.

82. A process of claim 76 comprising reaction of (1) at least one polyisocyanate having an average of about 2 or more isocyanate groups and (2) at least one polyol having an average of two or more hydroxyl groups per molecule.

83. A process of claim 82 comprising reaction of (1) at least one polyisocyanate having an average of about 2 to about 4 isocyanate groups, (2) a polyester polyol, polyether polyol, or combinations thereof, and (3) a chain extender comprising water, an inorganic or organic polyamine having an average of about 2 or more primary or secondary amine groups or combinations thereof, a polyalcohol, a urea, or combinations thereof.

84. A process of claim 83 wherein said chain extender comprises a compound selected from diethylene triamine, ethylene diamine, meta-xylylenediamine, aminoethyl ethanolamine, 2-methyl pentane diamine, propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary amines, sulfonated secondary amines, ethylene glycol, diethylene glycol, neopentyl glycol, butanediols, hexanediol, ureas, hydrazine, and mixtures thereof.

85. A process of claim 83 wherein said polyurethane has reacted therein at least one active hydrogen-containing compound not having said side chains, and said compound has a molecular weight from about 50 to about 10,000 grams/mole.

86. A process of claim 85 wherein said active hydrogen-containing compound not having said side chains has a molecular weight from about 200 to about 6,000 grams/mole.

87. A process of claim 86 wherein said active hydrogen-containing compound not having said side chains has a molecular weight from about 300 to about 3,000 grams/mole.

88. A process of claim 87 wherein said active hydrogen-containing compound not having said side chains comprises polysiloxane polyols, ethoxylated polysiloxane polyols, polytetrahydrofuran, polyethylene glycol, polypropylene glycol, poly(ethylene oxide), poly(butanediol adipate), hexane adipate isophthalate polyester, hexane neopentyl adipate polyester, or combinations thereof.

89. A process of claim 87 wherein said polyisocyanate comprises a diisocyanate.

90. A process of claim 89 wherein said diisocyanate comprises m-tetramethyl xylylene diisocyanate, p-tetramethyl xylylene diisocyanate, 1,1'-methylenebis-4-(isocyanato cyclohexane), isophorone diisocyanate, 4,4'-diphenylmethylene diisocyanate, toluene diisocyanate, or combinations thereof.

91. A process of claim 76 or 85 wherein said polyurethane also has reacted therein at least one compound having at least one crosslinkable functional group.

92. A process of claim 91 wherein said crosslinkable functional group comprises carboxylic, carbonyl, amine, hydroxyl, hydrazide, or combinations thereof.

93. A process of claim 92 wherein said compound having at least one crosslinkable functional group has the formula $(HO)_xQ(COOH)_y$ wherein Q is a straight or branched hydrocarbon radical having 1 to 12 carbon atoms, and x and y are 1 to 3.

94. A process of claim 93 wherein said compound having at least one crosslinkable functional group comprises at least one dihydroxy-carboxylic acid.

95. A process of claim 94 wherein said dihydroxy-carboxylic acid comprises dimethylolpropanoic acid.

96. A process of claim 88 wherein said chain extender comprises a compound selected from diethylene triamine, ethylene diamine, meta-xylylenediamine, aminoethyl ethanolamine, 2-methyl pentane diamine, propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary amines, sulfonated secondary amines, ethylene glycol, diethylene glycol, neopentyl glycol, butanediols, hexanediol, ureas, hydrazine, and mixtures thereof.

97. A process of claim 94 wherein said chain extender comprises a compound selected from diethylene triamine, ethylene diamine, meta-xylylenediamine, aminoethyl ethanolamine, 2-methyl pentane diamine, propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary amines, sulfonated secondary amines, ethylene glycol, diethylene glycol, neopentyl glycol, butanediols, hexanediol, ureas, hydrazine, and mixtures thereof.

98. A process comprising blending the polyurethane of claim 76 with at least one other polymer.

99. A process of claim 98 wherein said other polymer comprises natural rubber, a conjugated-diene-containing polymer, polychlorobutadiene, a hydrogenated styrene-butadiene triblock copolymer, chlorosulfonated polyethylene, an ethylene copolymer, an acrylic ester copolymer, a methacrylic ester copolymer, vinyl chloride copolymers, vinylidene chloride copolymers, polyisobutylene, a polyurethane, a polyurea, a poly(urethane/urea), or combinations thereof.

100. A process of claim 99 wherein said other polymer comprises an acrylic ester copolymer, methacrylic ester copolymer, or combinations thereof.

101. A process of claim 76 wherein said prepolymer is neutralized with a neutralizing agent before being dispersed in water.

102. A process of claim 76 wherein said prepolymer is chain extended in the presence of a neutralizing agent.

103. A process of claim 101 or 102 wherein said neutralizing agent is selected from primary amines, secondary amines, tertiary amines, metal hydroxides, ammonium hydroxide, and phosphines.

104. A process of claim 103 wherein said neutralizing agent is selected from triethyl amine, dimethyl ethanolamine, and N-methyl morpholine.

105. A personal care composition of claim 52 wherein said poly(alkylene oxide) side-chain units are present in an amount comprising about 29.9 wt. % to about 80 wt. % of said polyurethane.

106. A personal care composition of any of claims 54 to 75 or 105 comprising one or more components selected from chelators, conditions, diluents, fragrances, pigments, colorings, antioxidants, humectant skin and hair conditioners, lubricants, moisture barriers and emollients, neutralizers, opacifiers, pharmaceutical actives, preservatives, solvents, spreading aids, sunscreens, surfactants selected from nonionic, anionic, cationic, and zwitterionic surfactants, conditioning polymers, vitamins, viscosity adjusters, viscosity modifiers, and emulsifiers.

107. A personal care composition of claim 106 wherein said chelator is selected from EDTA and salts thereof, cyclodextrins, and mixtures thereof; said humectant skin and hair conditioners are selected from allantoin, pyrrolidonecarboxylic acid and thereof, hyaluronic acid and salts thereof, sorbic acid and salts thereof, urea, amino acids, polyhydroxy alcohols; polyethylene glycol, glycolic acid and glycolate salts, lactic acid and lactate salts, sugars and starches and derivatives thereof, D-panthenol, lactamide monoethanolamine, acetamide monoethanolamine, and mixtures thereof; said lubricants are selected from volatile silicones, polydimethylsiloxane gums, aminosilicones, phenylsilicones, polydimethyl siloxane, polydiethylsiloxane, polymethylphenlsiloxane, polydimethylsiloxane gums, polyphenl methyl siloxane gums, amodimethicone, trimethylsiloxyamodimethicone, and diphenyl-dimethyl polysiloxane gums, and mixtures thereof, said moisture barriers and emollients are selected from mineral oil, stearic acid, fatty alcohols, cetyl acetate in acetylated lanolin alcohol, isostearyl benzoate, dicaprylyl maleate, caprylic and capric triglyceride, petrolatum, lanolin, coco butter, shea butter, beeswax and esters thereof, ethoxylated fatty alcohol esters, avocado oil or glycerides, sesame oil or glycerides, safflower oil or glycerides, sunflower oil or glycerides, botanical seed oils, fatty acid and fatty alcohol esters, and highly branched hydrocarbons, and mixtures thereof; said neutralizers are selected from triethanolamine, aminomethyl propanol, ammonium hydroxide, sodium hydroxide, alkali hydroxides, borates, phosphates, pyrophosphates, cocamine, oleamine, diisopropanolamine, diisopropylamine, dodecylamine, PEG-15 cocamine, morpholine, tetrakis(hydroxypropyl) ethylenediamine, triamylamine, triethanolamine, triethylamine, 2-amino-2-hydroxymethyl-1,3-propanediol, and mixtures thereof; said opacifiers are selected from glycol fatty acid esters, alkoxylated fatty acid esters, fatty acid alcohols, hydrogenated fatty acids, waxes and oils, kaolin, magnesium silicate, titanium dioxide, silica, and mixtures thereof; said pharmaceutical actives are selected from antibiotics, antiviral agents, analgesics, antihistamines, anti-flammatory agents, antipruritics, antipyretics, anesthetic agents, diagnostic agents, hormones, antifungals, antimicrobials, cutaneous growth enhancers, pigment modulators, antiproliferatives, antipsoriatics, retinoids, retinoids, anti-acne medicaments, antineoplastics agents, phototherapeutic agents, and keratolytics, and mixtures thereof; said preservatives are selected from polymethoxy bicyclic oxazolidine, methylparaben, propylparaben, ethylparaben, butylparaben, benzoic acid and salts thereof, benzyltriazole, 1,3-dimethyl-5,5-dimethyl hydantoin, imidazolidinyl urea, phenoxyethanol, phenoxyethylparaben, methylisothiazolinone, methylchloroisothiazolinone, benzoisothiazolinone, triclosan, sorbic acid, salicylic acid salts, and mixtures thereof; said spreading acids are selected from hydroxypropyl methylcellulose, hydrophobically modified cellulosics, xanthan gum, cassia gum, guar gum, locust bean gum, dimethicone copolyols of various degrees of alkoxylation, boron nitride, talc, and mixtures thereof; said sunscreens are selected from p-aminobenzoic acid and salts and derivatives thereof, anthranilates, salicylates cinnamic acid derivatives, dihydroxycinnamic acid derivatives, trihydroxycinnamic acid derivatives, diphenylbutadiene, stilbene; dibenzalacetone, benzalacetophenone; naphtholsulfonates; dihydroxy-naphthoic acid and salts thereof, o-and p-hydroxybiphenyldisulfonates, coumarin derivatives, diazoles, quinine salts, quinoline derivatives, hydroxymethoxy-substituted benzophenones, uric and vilouric acids, tannic acid and its derivatives, (butyl carbityl) (6-propyl piperonyl) ether, hydroquinone, benzophenones, butylmethoxyldibenzoylmethane; oxtocrylene, 4-isopropyl-dibenzoylmethane, and camphor derivates, titanium dioxide, zinc oxide, silica, iron oxide and iron dioxide, said surfactants are selected from silicone esters, alkyl and alkenyl sulfates, alkyl and alkenyl ethoxylated sulfates, succinamate surfactants, neutralized fatty acid esters of isethionic acid, alkyl and alkenyl sulfonates, alkyl amphoglycinates, alkyl amphopropionates, alkyl amino sulfonates, alkyl betaines and alkyl amido betaines, stearamido propyl dimethyl amine, diethyl amino ethyl stearamide, dimethyl stearamine, dimethyl soyamine, soyamine, myristyl amine, tridecyl amine, ethyl stearylamine, N-tallowpropane diamine, ethoxylated stearylamine, dihydroxy ethyl stearylamine, and arachidylbehenylamine; said conditioning polymers are selected from quaternized guar gum, quaternized cellulosics, polyquaternium 4, polyquaternium 7, polyquaternium 10, polyquaternium 11, polyquaternium 39, polyquaternium 44, and mixtures thereof; said vitamins are selected from vitamin A, vitamin B, biotin, pantothenic acid, vitamin C, vitamin D, vitamin E, tocopherol acetate, retinyl palmitate, magnesium ascorbyl phosphate, and derivatives and mixtures thereof; said viscosity adjusters are selected from xanthan gums, cellulosics, modified cellulosics, starches, polysaccharides, crosslinked polyacrylates, alkali swellable emulsion acrylate copolymers, hydrophobically modified alkali swellable copolymers, hydrophobically modified non-ionic polyurethanes, and mixtures thereof; said viscosity modifiers are selected from xanthan gums, cellulosics, modified cellulosics starches, polysaccharides, crosslinked polyacrylates, alkali swellable emulsion acrylate copolymers, hydrophobically modified alkali swellable copolymers, hydrophobically modified non-ionic polyurethanes, and mixtures thereof; and mixtures thereof.

108. A polyurethane composition having an upright moisture vapor transmission rate (MVTR) of more than about 500 gm/m$^2$/24 hr and comprising:
(a) poly(alkylene oxide) side-chain units in an amount comprising about 12 wt. % to about 80 wt. % of said polyurethane, wherein (i) alkylene oxide groups in said poly(alkylene oxide) side-chain units have from 2 to 10 carbon atoms are unsubstituted, substituted, or both unsubstituted and substituted, (ii) at least about 50 wt. % of said alkylene oxide groups are ethylene oxide, (b) poly(ethylene oxide) main-chain units in an amount comprising less than about 25 wt. % of said polyurethane, and (c) at least one crosslinkable functional group derived from a compound of the formula (HO)$_x$Q(COOH)$_y$ wherein Q is a straight or branched hydrocarbon radical having 1 to 12 atoms, and x and y are 1 to 3.

109. A composition of claim 108 wherein said compound comprises a dihydroxy-carboxylic acid.

110. A composition of claim 109 wherein said dihydroxy-carboxylic acid is dimethylolpropanoic acid.

111. A composition of claim 108 wherein said poly(alkylene oxide) side-chain units comprise poly(ethylene oxide) units.

112. A composition of claim 108 wherein said polyurethane comprises the reaction product of (1) at least one polyisocyanate having an average of about 2 or more isocyanate groups and (2) at least one polyol having an average of two or more hydroxyl groups per molecule.

113. A composition of claim 112 wherein said polyurethane comprises the reaction product of (1) at least one polyisocyanate havin an average of about 2 to about 4 isocyanate groups, (2) at least one polyester polyol, polyether polyol, or combinations thereof, and (3) at least one chain extender comprising water, an inorganic or organic polyamine having an average of about 2 or more primary or secondary amine groups or combinations thereof, a polyalcohol, a urea, or combinations thereof.

114. A composition of claim 113 wherein said chain extender comprises a compound selected from diethylene triamine, ethylene diamine, meta-xylylenediamine, aminoethyl ethanolamine, 2-methyl pentane diamine, propylene diamine, butylene diamine, hexamethylene diamine, cyclohexylene diamine, phenylene diamine, tolylene diamine, 3,3-dichlorobenzidene, 4,4'-methylene-bis-(2-chloroanilin), 3,3-dichloro-4,4-diamino diphenylmethane, sulfonated primary amines, sulfonated secondary amines, ethylene glycol, diethylene glycol, neophentyl glycol, butanediols, hexanediol, ureas, hydrazine, and mixtures thereof.

115. A composition of claim 113 wherein said polyurethane has reacted therein at least one active hydrogen-containing compound not having said side chains, and said compound has a molecular weight from about 50 to about 10,000 grams/mole.

116. A composition of claim 115 wherein said active hydrogen-containing compound not having said side chains has a molecular weight from about 200 to about 6,000 grams/mole.

117. A composition of claim 115 wherein said active hydrogen-containing compound not having said side chains comprises a polyol or polyamine having a molecular weight from about 300 to about 3,000 grams/mole.

118. A composition of claim 117 wherein said active hydrogen-containing compound not having said side chains comprises polysiloxane polyols, ethoxylated polysiloxane polyols, polytetrahydrofuran, polyethylene glycol, polypropylene glycol, poly(ethylene oxide), poly(butanediol adipate), hexane adipate isophthalate polyester, hexane neopentyl adipate polyester, or combinations thereof.

119. A composition of claim 117 wherein said polyisocyanate comprises a diisocyanate.

120. A composition of claim 119 wherein said diisocyanate comprises m-tetramethyl xylylene diisocyanate, p-tetramethyl xylylene diisocyanate, 1,1'-methylenebis-4-(isocyanato cyclohexane), isophorone diisocyanate, 4,4'-diphenylmethylene diisocyanate, toluene diisocyanate, or combinations thereof.

121. A composition of claim 118 wherein said chain extender comprises a compound selected from diethylene triamine, ethylene diamine, meta-xylylenediamine, aminoethyl ethanolmaine, 2-methyl pentane diamine, propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, sulfonated primary amines, sulfonated secondary amines, ethylene glycol, diethylene glycol, neopentyl glycol, butanediols, hexanediol, ureas, hydrazine, and mixtures thereof.

122. A composition of claim 18, 19, 20, 108, 109, or 110 wherein said crosslinkable functional group is neutralized.

123. A composition of claim 108 wherein said poly(ethylene oxide) main-chain units comprise 0 wt. % of said polyurethane.

124. A personal care composition of claim 71, 72, or 73 wherein said crosslinkable group is neutralized.

* * * * *